United States Patent
Lee

(10) Patent No.: US 9,829,917 B2
(45) Date of Patent: Nov. 28, 2017

(54) ELECTRONIC DEVICE WITH ROTATABLE STRUCTURE

(71) Applicant: Samsung Electronics Co., Ltd., Gyeonggi-do (KR)

(72) Inventor: Hyung-Woo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/237,199

(22) Filed: Aug. 15, 2016

(65) Prior Publication Data

US 2017/0048994 A1    Feb. 16, 2017

(30) Foreign Application Priority Data

Aug. 13, 2015 (KR) .......................... 10-2015-0114967

(51) Int. Cl.
   *G06F 1/16*    (2006.01)
   *G04G 17/00*   (2013.01)
   *G04G 17/08*   (2006.01)

(52) U.S. Cl.
   CPC ............. *G06F 1/163* (2013.01); *G04G 17/00* (2013.01); *G04G 17/08* (2013.01)

(58) Field of Classification Search
   CPC ......... G06F 1/163; G04G 17/00; G04G 17/08
   See application file for complete search history.

(56) References Cited

U.S. PATENT DOCUMENTS

| | | | |
|---|---|---|---|
| 2008/0043575 A1* | 2/2008 | Fasciano | G04G 9/0076 368/13 |
| 2008/0068935 A1 | 3/2008 | Hiranuma et al. | |
| 2011/0007468 A1* | 1/2011 | Burton | G04F 10/00 361/679.03 |
| 2011/0221688 A1 | 9/2011 | Byun et al. | |
| 2012/0087216 A1* | 4/2012 | Keung | A44C 5/0084 368/282 |
| 2015/0085627 A1 | 3/2015 | Hiranuma et al. | |
| 2015/0130666 A1* | 5/2015 | Pan | H02J 7/0045 343/702 |
| 2015/0181087 A1 | 6/2015 | Mistry et al. | |
| 2016/0252115 A1* | 9/2016 | Wang | G06F 1/163 361/679.03 |

FOREIGN PATENT DOCUMENTS

| | | |
|---|---|---|
| JP | 08-152486 | 6/1996 |
| KR | 1020130056821 | 5/2013 |

OTHER PUBLICATIONS

International Search Report dated Nov. 18, 2016 issued in counterpart application No. PCT/KR2016/008942, 12 pages.

* cited by examiner

*Primary Examiner* — Adrian S Wilson
(74) *Attorney, Agent, or Firm* — The Farrell Law Firm, P.C.

(57) ABSTRACT

Disclosed is an electronic device electronic device that has a single part, which allows a wheel dial to be fixed to a housing of the electronic device, and prevents the wheel dial from moving horizontally and vertically relative to the housing.

20 Claims, 33 Drawing Sheets

ELECTRONIC DEVICE WITH ROTATABLE STRUCTURE

PRIORITY

This application claims priority under 35 U.S.C. §119(a) to a Korean Patent Application which was filed in the Korean Intellectual Property Office on Aug. 13, 2015 and assigned Serial No. 10-2015-0114967, the contents of which are incorporated herein by reference.

BACKGROUND OF THE DISCLOSURE

1. Field of the Disclosure

The present disclosure relates generally to an electronic device, and more particularly, to an electronic device that includes a rotatable structure.

2. Description of the Related Art

An electronic device generally performs a specific function according to an equipped program, such as an electronic scheduler, a portable multimedia reproducer, a mobile communication terminal, a tablet personal computer (PC), an image/sound device, a desktop/laptop PC, or a vehicular navigation system, as well as a home appliance. Such an electronic device outputs information stored therein as sound or an image.

As the degree of integration of such an electronic device has increased, and as super-high speed and large capacity wireless communication has become popular, various functions have recently been equipped in a single mobile communication terminal. For example, entertainment, multimedia, communication and security for mobile banking, schedule management, and e-wallet functions are now integrated in a single electronic device, in addition to a communication function.

Recently, wearable electronic devices have been proposed that are capable of being mounted on a human body to be used and are embodied in such devices as eyeglasses or a watch.

Such electronic devices are provided with various types of wheel dial-like member (hereinafter, a "wheel dial"). However, the conventional art is very limited as to the use of such wheel dials, which is an inconvenience to the user. As such, there is a need in the art for increased versatility of an electronic device that includes a rotatable structure.

SUMMARY

The present disclosure has been made to address at least the above-mentioned problems and/or disadvantages and to provide at least the advantages described below.

Accordingly, an aspect of the present disclosure is to provide a wheel dial, which is provided on an electronic device, in a rotatable manner on the housing of the electronic device so as to turn on/off the power of the electronic device, to execute the electronic device in the sleep mode state in which only the power is on, and to implement an input to the electronic device in the driving mode state by executing a function of the electronic device, depending on the rotation of the wheel dial.

Another aspect of embodiments of the present disclosure is to provide a structurally simplified electronic device since a configuration, which fixes a wheel dial to the housing and prevents the wheel dial from moving from the housing after being fixed, is implemented by a single configuration.

Another aspect of embodiments of the present disclosure is to provide an electronic device in which, with a single part, the wheel dial may be fixed to the housing and the wheel dial is prevented from moving horizontally and vertically relative to the housing.

Another aspect of embodiments of the present disclosure is, by securing the rigidity of the constituent elements that are provided to fix the wheel dial to the housing and to prevent the wheel dial from moving, to provide an electronic device that is capable of securing assemblability and the impact resistance of constituent elements, which is applied according to impact generated to the wheel dial.

Another aspect of embodiments of the present disclosure is to provide an electronic device that is capable of suppressing the occurrence of noise and dust due to friction caused according to the rotation of the wheel dial by using a lubricant material for constituent elements that are provided to fix the wheel dial to the housing and to prevent the wheel dial from horizontally and vertically moving relative to the housing.

According to an aspect of embodiments of the present disclosure, an electronic device includes a housing that includes a first face that faces in a first direction, and a second face that faces in a second direction that is opposite to the first direction, a circular opening that is formed in the first face of the housing, a circular display that is at least partially exposed through the circular opening, a first ring-shaped structure that is disposed around the circular opening, a second ring-shaped structure that is disposed around the circular opening, and is physically rotatable, and a coupling structure that is disposed between at least a portion of the first ring-shaped structure and at least a portion of the second ring-shaped structure, wherein the first ring-shaped structure includes a first portion that is flat and is positioned adjacent to the display, which is at least partially exposed, along a periphery of the display, a second portion that protrudes in the first direction from a region of the first portion, which is adjacent to the display, and a first recess that is formed along a periphery of the second portion, wherein the second ring-shaped structure includes a second recess that is formed along the periphery of the second ring-shaped structure, and wherein the coupling structure includes a body that forms a closed loop that extends along the at least one of first ring-shaped structure and the second ring-shaped structure, a first protrusion that completely fills at least a portion of the first recess, and a second protrusion that completely fills at least a portion of the second recess.

According to an aspect of embodiments of the present disclosure, an electronic device includes a housing that includes a first face that faces in a first direction, and a second face that faces in a second direction that is opposite to the first direction, a circular opening that is formed in the first face of the housing, a circular display that is at least partially exposed through the opening, a first annular structure that is disposed around the opening, a second annular structure that is disposed around the opening to be physically rotatable in relation to the first annular structure, and forms an annular channel with at least a portion of the first annular structure, and a ring structure that is included in the annular channel, wherein the ring structure includes a ring that forms a closed loop along the annular channel, at least one first protrusion that protrudes in the second direction from the ring, at least one second protrusion that protrudes in a third direction that is in a radially inward direction of the ring, and at least one third protrusion that protrudes in a fourth direction that is in a radially outward direction of the ring.

According to an aspect of embodiments of the present disclosure, an electronic device includes a housing that includes a first face that faces in a first direction, and a second face that faces in a second direction that is opposite to the first direction; a circular opening that is formed in the first face of the housing; a circular display that is at least partially exposed through the opening; a first ring-shaped structure that is disposed around the opening; a second ring-shaped structure that is disposed around the opening, and is physically rotatable; and a coupling structure that is disposed between at least a portion of the first ring-shaped structure and at least a portion of the second ring-shaped structure.

According to an aspect of embodiments of the present disclosure, an electronic device includes a housing that includes a first face that faces in a first direction, and a second face that faces in a second direction that is opposite to the first direction, a circular opening that is formed in the first face of the housing, a circular display that is at least partially exposed through the opening, a first ring-shaped structure that is disposed around the opening, a second ring-shaped structure that is disposed around the opening, and is physically rotatable, and a coupling structure that is disposed between at least a portion of the first ring-shaped structure and at least a portion of the second ring-shaped structure, wherein the first ring-shaped structure includes a first portion that is flat and is positioned adjacent to the display, which is at least partially exposed, along a periphery of the display, and first hook portions that are spaced apart from each other along the periphery of the first portion and protrude in the first direction, wherein the second ring-shaped structure includes a second hook portion that is formed along a periphery of the second ring-shaped structure, and wherein the coupling structure includes a body that forms a closed loop that extends along at least one of the first ring-shaped structure and the second ring-shaped structure, a first protrusion that is at least partially hooked to the first hook portion, and a second protrusion that is at least partially hooked to the second hook portion.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Figure 1:
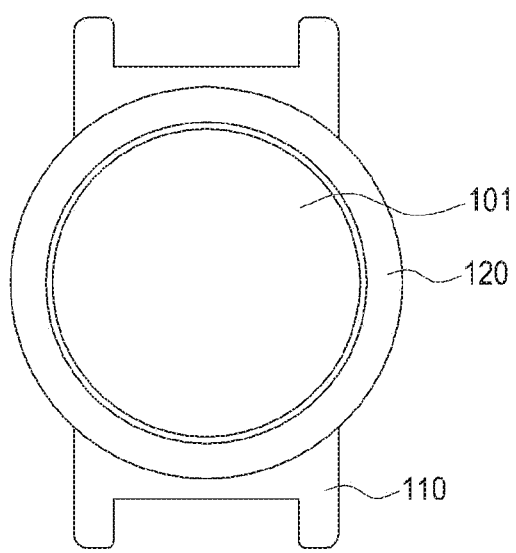
FIG. 1 schematically illustrates an electronic device according to embodiments of the present disclosure.

Hereinafter, embodiments of the present disclosure are described with reference to the accompanying drawings.

However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings. Detailed descriptions of known functions and/or configurations will be omitted for the sake of clarity and conciseness.

The present disclosure may be variously modified and has various embodiments. However, it should be understood that the present disclosure is not limited to the specific embodiments, but includes all modifications, equivalents, and alternatives within the spirit and the scope of the present disclosure.

Although ordinal terms such as "first" and "second" may be used to describe various elements, these elements are not limited by the terms. The terms are used merely for the purpose to distinguish an element from the other elements. For example, a first element could be referred to as a second element, and similarly, a second element could be also referred to as a first element without departing from the scope of the present disclosure. As used herein, the term "and/or" includes any and all combinations of one or more associated items.

Relative terms such as "a front surface", "a rear surface", "a top surface", and "a bottom surface", which are described with respect to the orientation in the drawings may be replaced by ordinal numbers such as first and second, providing an order determined in the disclosed order or arbitrarily, and may not be arbitrarily changed if necessary.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not preclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present specification.

In the present disclosure, an electronic device may be a random device, and may be referred to as a terminal, a portable terminal, a mobile terminal, a communication terminal, a portable communication terminal, a portable mobile terminal, or a display device, for example.

Herein, the electronic device may be a smartphone, a portable phone, a game player, a television (TV), a display unit, a heads-up display unit for a vehicle, a notebook computer, a laptop computer, a tablet personal computer (PC), a personal media player (PMP), and a personal digital assistant (PDA), for example. The electronic device may be implemented as a portable communication terminal which has a wireless communication function and a pocket size. The electronic device may be a flexible device or a flexible display device.

The electronic device may be a wearable device to be linked with an electronic device such as a smart phone.

The electronic device communicates with an external electronic device, such as a server, or performs an operation through an interworking with the external electronic device. For example, the electronic device transmits an image photographed by a camera and/or position information detected by a sensor unit to the server through a network. The network may be a mobile or cellular communication network, a local area network (LAN), a wireless local area network (WLAN), a wide area network (WAN), the Internet, a small area network (SAN) for example, but is not limited thereto.

Herein, the term "user" may refer to a person who uses an electronic device or a device that uses an electronic device, such as an artificial intelligence electronic device.

Figure 2A:
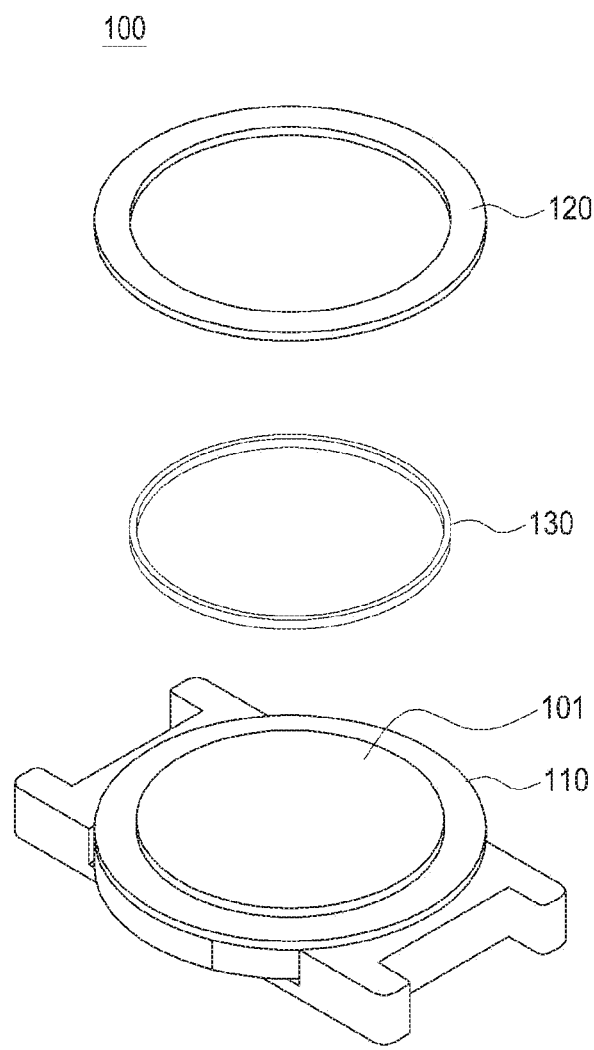
FIG. 2A illustrates the electronic device according to embodiments of the present disclosure.
Figure 2B:
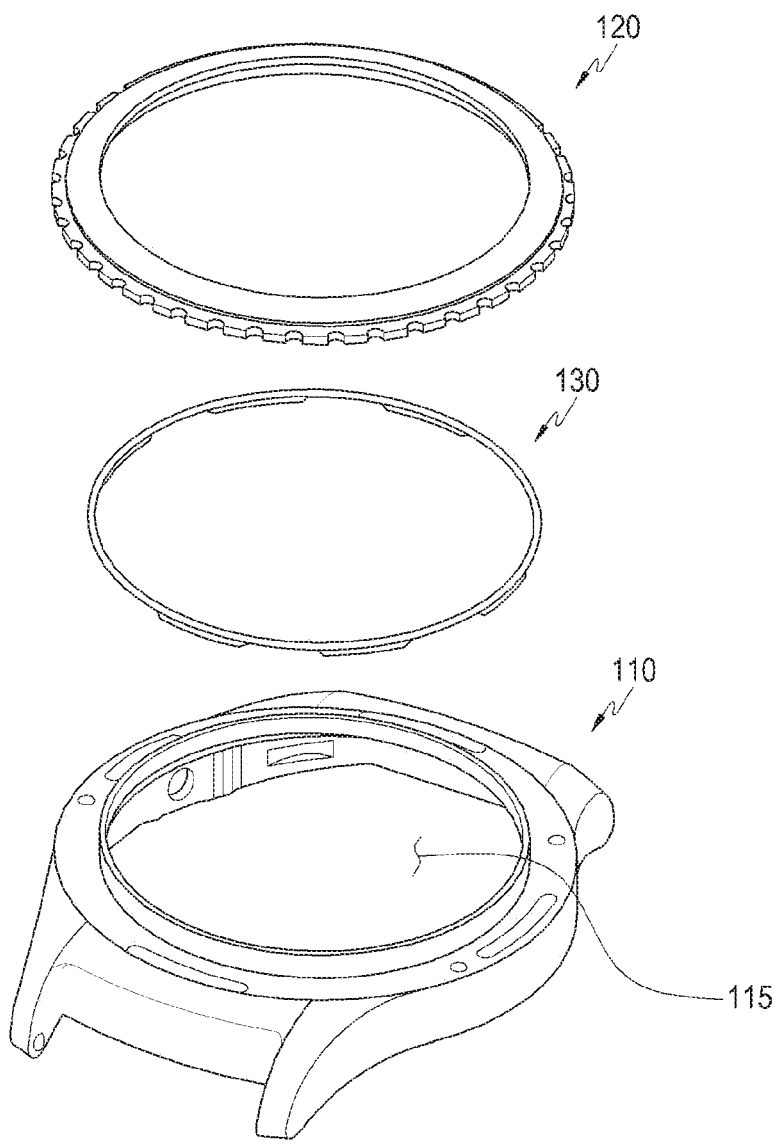
FIG. 2B illustrates the electronic device according to embodiments of the present disclosure.

FIG. 1 schematically illustrates an electronic device 100 according to embodiments of the present disclosure. FIG. 2A is a perspective view of the electronic device 100 according to embodiments of the present disclosure. FIG. 2B is a perspective view illustrating the electronic device 100 according to embodiments of the present disclosure.

Referring to FIGS. 1, 2A and 2B, an electronic device 100 includes a housing 110, a circular display 101, a second ring-shaped structure 120 (hereinafter, a "wheel dial member 120") and a coupling structure 130 (hereinafter, a "wheel dial fixing member 130").

According to one embodiment of the present disclosure, the electronic device 100 may be a watch-type wearable electronic device 100. However, the electronic device 100 is not limited thereto, and includes any electronic device that is provided with a dial member 120, such as a smart phone and a wearable electronic device (refer to the FIGS. 4A to 4C.

Figure 3A:
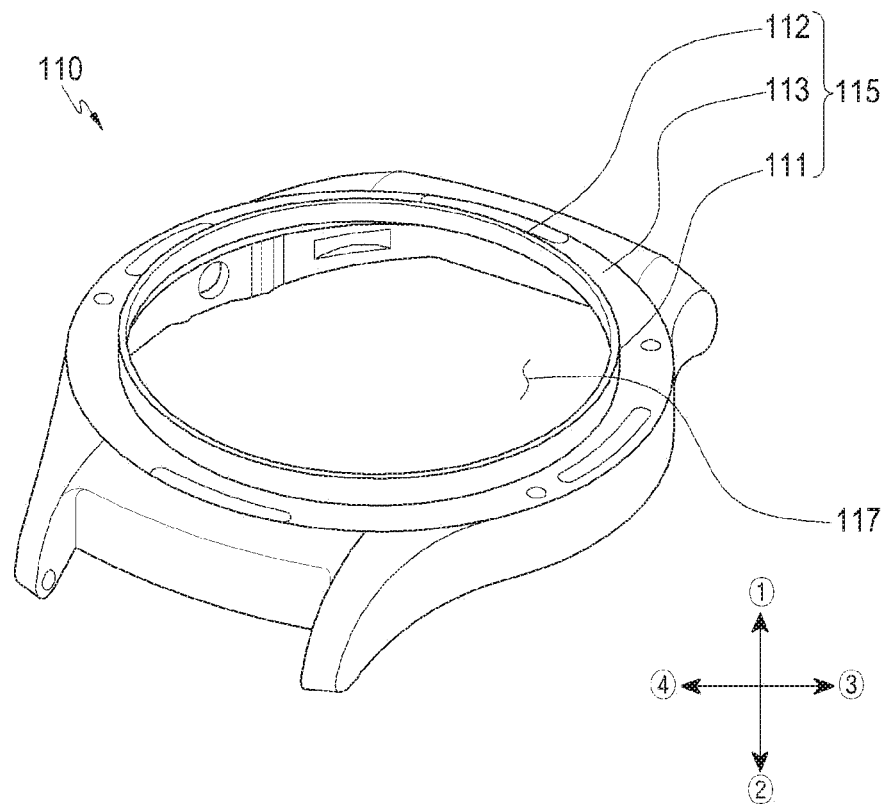
FIG. 3A illustrates a housing in the electronic device according to embodiments of the present disclosure.
Figure 3B:
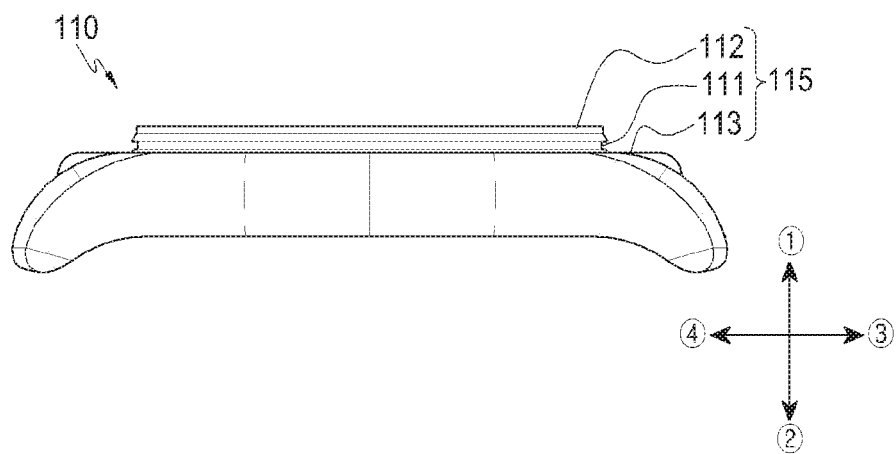
FIG. 3B illustrates one side face of the housing, in the electronic device according to embodiments of the present disclosure.
Figure 3C:
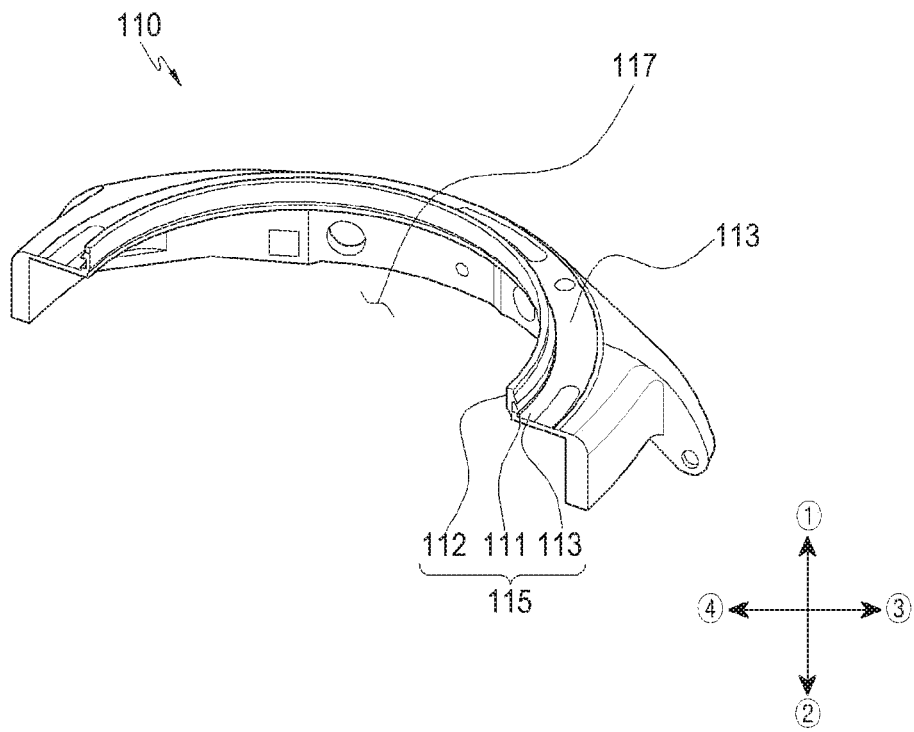
FIG. 3C illustrates the inner structure of the housing by partially cutting the housing in the electronic device according to embodiments of the present disclosure.
Figure 3D:
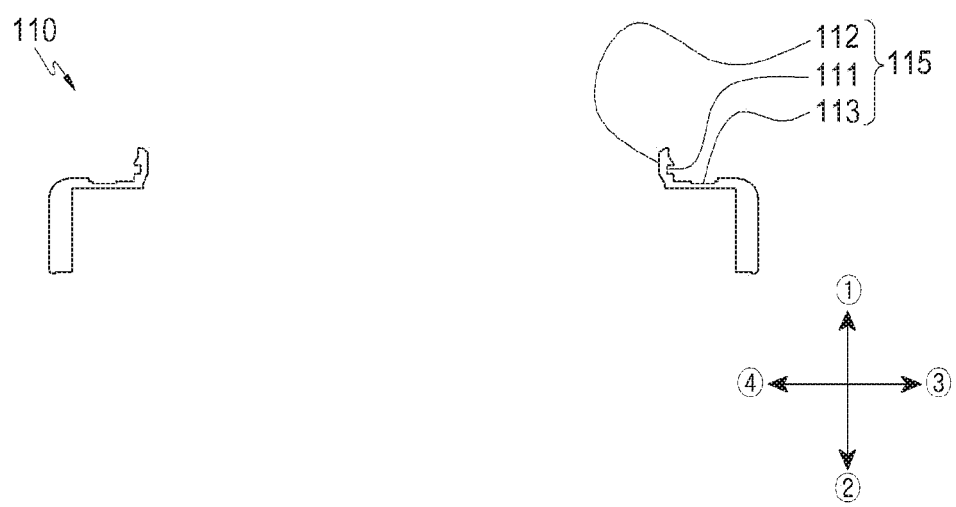
FIG. 3D illustrates the housing in the electronic device according to embodiments of the present disclosure.

FIG. 3A illustrates the housing 110 in the electronic device 100 according to embodiments of the present disclosure. FIG. 3B illustrates one side face of the housing 110 in the electronic device 100 according to embodiments of the present disclosure. FIG. 3C illustrates an inner structure of the housing 110 by cutting a portion of the housing 110 in the electronic device 100 according to embodiments of the present disclosure. FIG. 3D is a cross-sectional view of the housing 110 in the electronic device 100 according to embodiments of the present disclosure.

Referring to FIGS. 3A, 3B, 3C and 3D, the housing 110 includes a first face that faces in a first direction, such as the upward direction in FIG. 2, and a second face that faces in a second direction that is opposite to the first direction, such as the downward direction in FIG. 2. A circular opening 117 is formed in the first face of the housing 110, and a display 101 that displays a screen is provided in the first face of the housing 110, such that at least a portion of the display 101 may be exposed through the opening 117, and various inner mounting components, such as a camera, a speaker, a circuit board, and various sensors are mounted inside the display 101, which is formed in a circular shape to be engaged in the circular opening 117.

A first ring-shaped structure 115 is on the rim of the housing 110 and a wheel dial member 120, to be described later herein, is rotatably seated and fixed to the first ring-shaped structure 115.

The first ring-shaped structure 115 includes a first portion 113, a second portion 112, and a first recess 111.

The first portion 113 is formed in a flat shape along the periphery of the display 101, at least a portion of which is exposed, and to be adjacent to the display 101.

The second portion 112 protrudes in the first direction from a region adjacent to the display 101 in the first portion 113. For example, the second portion 112 protrudes in the first direction along the outer rim of the opening 117.

The first recess 111 is formed in a third direction that is directed toward the center of the first ring-shaped structure 115, and is formed along the periphery of the second portion 112.

Figure 4A:
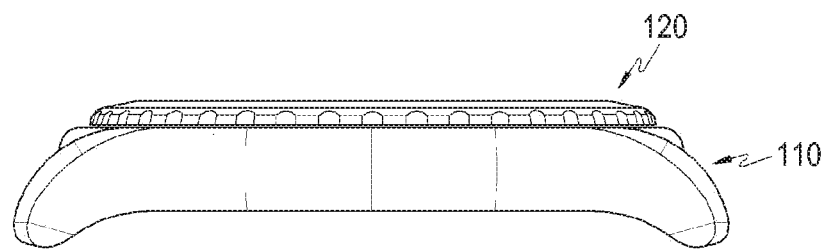
FIG. 4A illustrates a state in which a wheel dial member is coupled on the housing in the electronic device according to embodiments of the present disclosure.
Figure 4B:
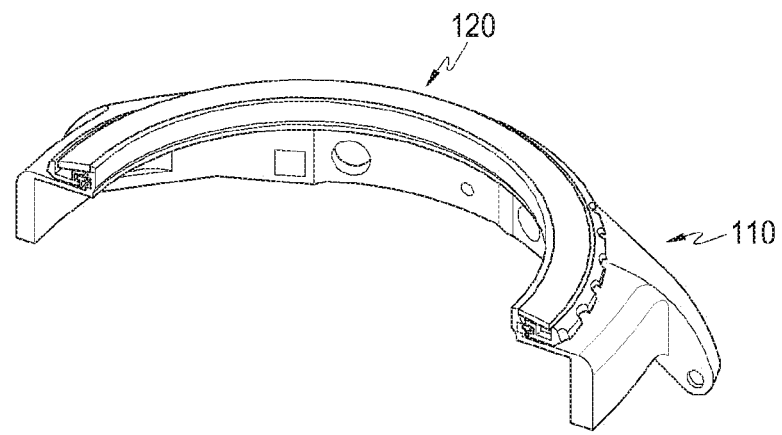
FIG. 4B illustrates an inner structure by cutting a portion of a wheel dial member and a housing in a state where the wheel dial member is coupled on the housing in the electronic device according to embodiments of the present disclosure.
Figure 4C:
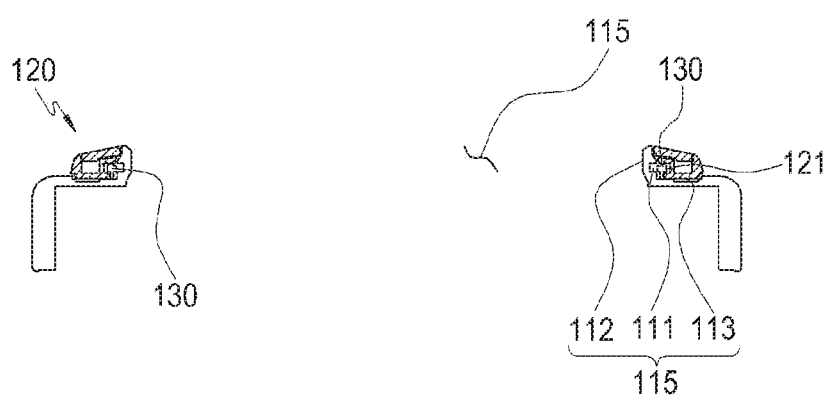
FIG. 4C is a side cross-sectional view when the wheel dial member is coupled on the housing in the electronic device according to embodiments of the present disclosure.

FIG. 4A illustrates when the wheel dial member 120 is coupled on the housing 110 in the electronic device 100 according to embodiments of the present disclosure. FIG. 4B illustrates an inner structure by partially cutting the wheel dial member 120 and the housing 110 when the wheel dial member 120 is coupled on the housing 110 in the electronic device 100 according to embodiments of the present disclosure. FIG. 4C illustrates when the wheel dial member 120 is coupled on the housing 110 in the electronic device 100 according to embodiments of the present disclosure.

Referring to FIGS. 4A, 4B and 4C, the wheel dial member 120 is on one face of the housing 110, such as on the periphery of the first ring-shaped structure 115 around the opening 117, and is fixed and coupled thereto to be physically rotatable. The wheel dial member 120 may be implemented to be rotatable 360 degrees in the clockwise direction, in the counterclockwise direction, or in both directions along the periphery of the housing 110, and is provided to execute various driving modes according to the rotation of the wheel dial member 120.

According to one embodiment of the present disclosure, the wheel dial member 120 has a circular or a ring-shaped disc shape. The wheel dial member 120 is fixed to the housing 110 through the wheel dial fixing member 130. As a result, the wheel dial member 120 may be fixed to the housing 110 such that the wheel dial member 120 is only capable of being rotationally driven. In other words, the wheel dial member 120 is suppressed from moving vertically (up-and-down directions) and horizontally, relative to the housing 110.

Figure 5A:
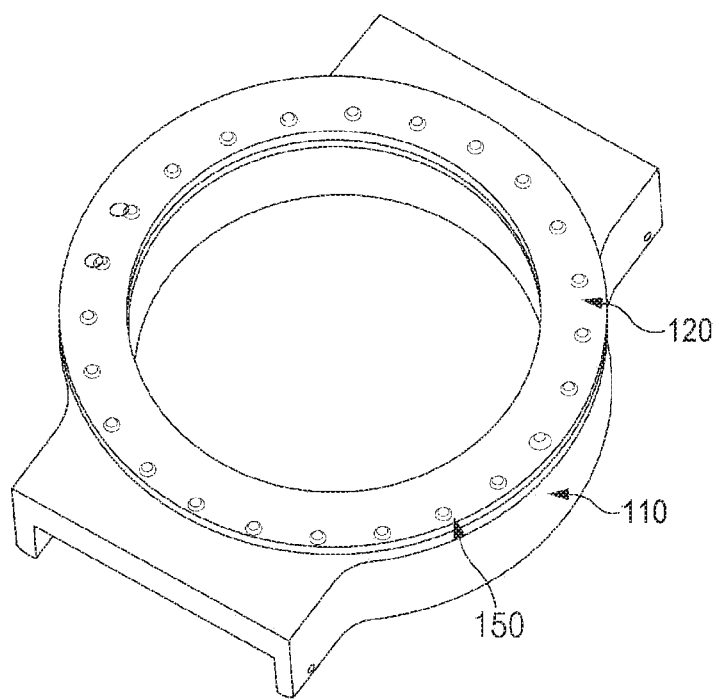
FIG. 5A illustrates an electronic device according to embodiments of the present disclosure.
Figure 5B:
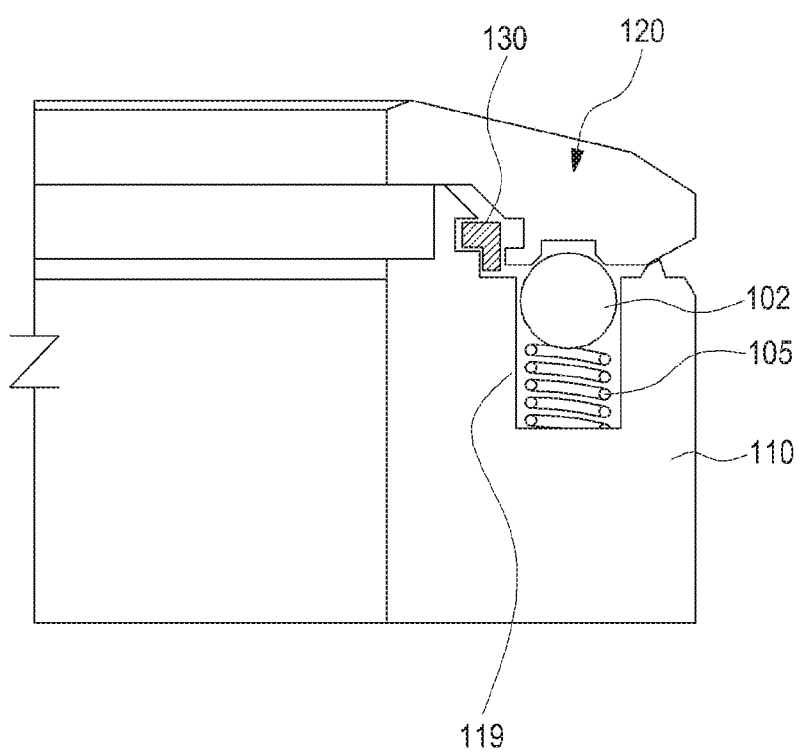
FIG. 5B illustrates the periphery of the housing on which the wheel dial member is disposed in the electronic device according to embodiments of the present disclosure.

FIG. 5A is a perspective view of the electronic device 100 according to embodiments of the present disclosure. FIG. 5B is a cross-sectional view of a periphery of the housing 110 on which the wheel dial member 120 is disposed in the electronic device 100 according to embodiments of the present disclosure.

Referring to FIGS. 5A and 5B, the housing 110 of the electronic device 100 includes an elastic member, such as a spring 105, and a ball-shaped insertion member 102 that is supported by the elastic member 101. On the bottom face of the wheel dial member 120, a hole is formed such that the insertion member 102 is inserted into the hole. When the wheel dial member 120 is rotated, the hole formed on the bottom face of the wheel dial member 120 is also rotated. Thus, when the insertion member 102 is in contact with a no-hole area of the bottom face of the wheel dial member 120 and is then inserted into the hole formed on the bottom face of the wheel dial member 120, the user experiences a click sensation according to the rotation of the wheel dial member 120.

While the embodiment of the present disclosure is formed such that a click sensation is provided through a ball or a spring when the wheel dial member 120 is rotated, the present disclosure is not limited thereto. For example, various modifications or changes may be made, including a plurality of elastic member 101 and insertion members 102 being arranged, together with magnetic bodies, at preset angular intervals around the center of the housing 110 and a plurality of holes being formed on the lower end of the wheel dial member 120 to be arranged at preset angular intervals around the center of the wheel dial member 120.

Figure 6:
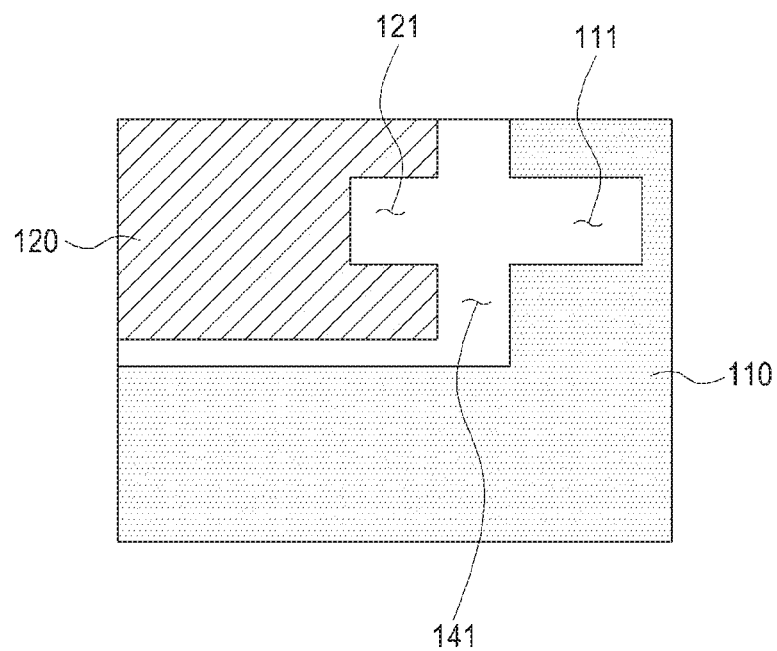
FIG. 6 illustrates a housing to which a wheel dial member is coupled in the electronic device according to embodiments of the present disclosure.

FIG. 6 illustrates when the wheel dial member 120 is coupled to the housing 110 in the electronic device 100 according to embodiments of the present disclosure.

Inside the housing 110, a first recess 111 is provided such that a first protrusion 132 of a wheel dial fixing member 130, to be described later herein, is seated in the first recess 111. In one embodiment of the present disclosure, the first recess 111 has a recess shape recessed in a horizontal direction of a third direction that is oriented to the center of the first ring-shaped structure 115, but the present disclosure is not limited thereto. That is, depending on the shape of the first protrusion 132, the shape or structure of the first recess may be freely modified. For example, a locking recess may be further formed as in a "⊐" shape.

The wheel dial member 120 is provided with a second recess 121 such that, when the wheel dial member 120 is mounted on the periphery of the housing 110, the second recess 121 is correspondingly connected to the first recess 111 of the housing 110. A second protrusion 133 of the wheel dial fixing member 130 is seated in the second recess 121. In one embodiment of the present disclosure, the second recess 121 has a recess shape recessed in a horizontal direction of a fourth direction that is opposite to the third direction that is oriented to the center of the first ring-shaped structure 115, but the present disclosure is not limited thereto. That is, depending on the shape of the second protrusion 133, the shape or structure of the first recess may be freely modified. For example, a locking recess may be further formed inwardly as in a "Γ" shape.

A third recess 141 is provided between the housing 110 and the wheel dial member 120 when the wheel dial member 120 is mounted on one side of the housing 110. A third protrusion 134 of the wheel dial fixing member 130, to be described later herein, is seated in the third recess 141, so that the wheel dial member 120 is suppressed from moving horizontally, relative to the housing 110.

Figure 7:
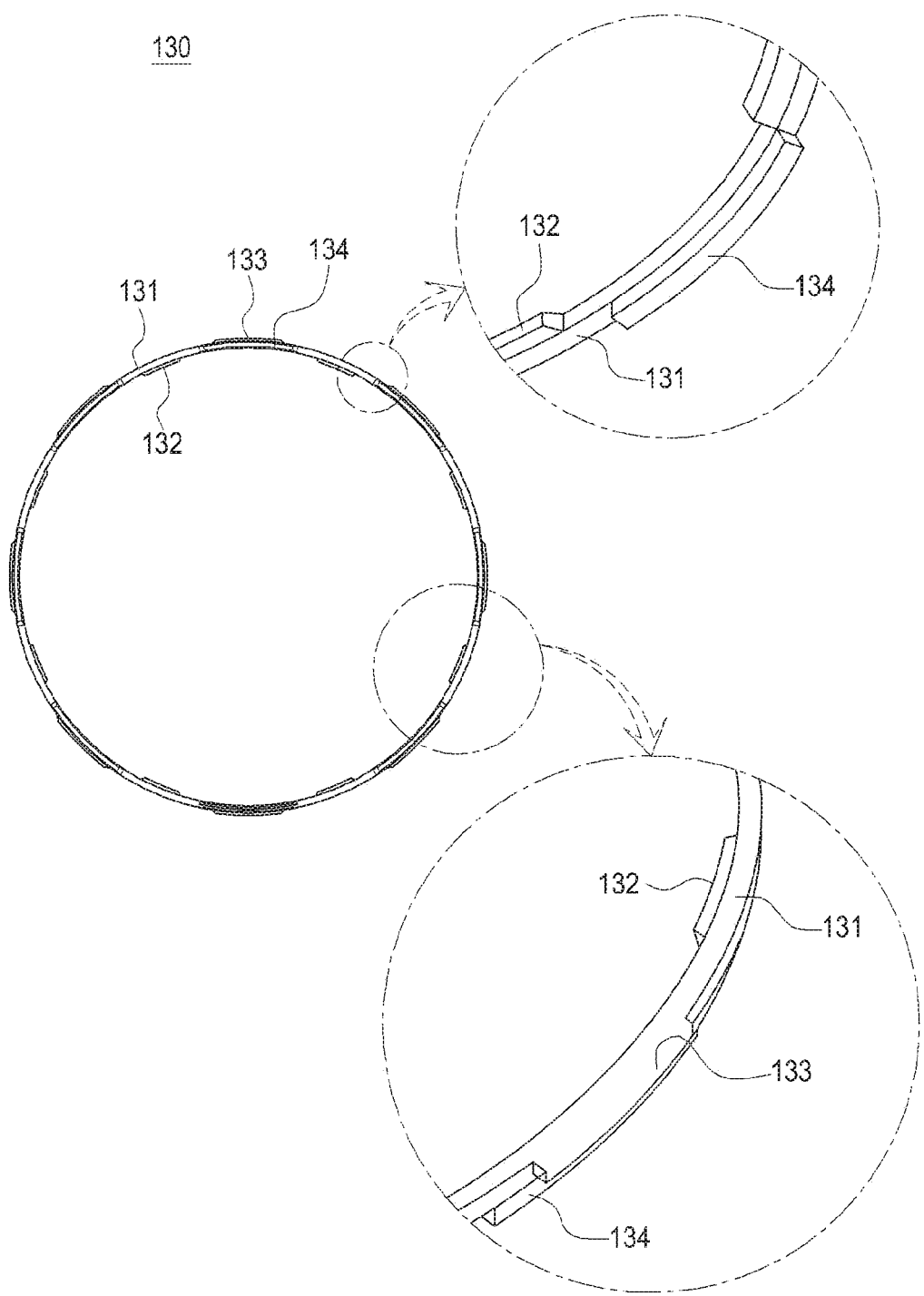
FIG. 7 illustrates a wheel dial fixing member in the electronic device according to embodiments of the present disclosure.
Figure 8:
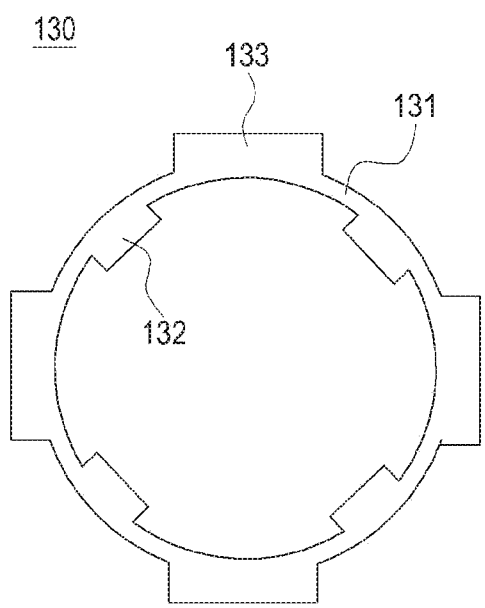
FIG. 8 illustrates the wheel dial fixing member in the electronic device according to embodiments of the present disclosure.

FIG. 7 schematically illustrates the wheel dial fixing member 130 in the electronic device 100 according to embodiments of the present disclosure. FIG. 8 schematically illustrates the wheel dial fixing member 130 in the electronic device 100 according to embodiments of the present disclosure.

Referring to FIGS. 7 and 8, the wheel dial fixing member 130 is between the housing 110 and the wheel dial member 120, and is provided such that, when the wheel dial member 120 is coupled to the housing 110, the wheel dial member 120 is rotatably fixed to the housing 110, and is suppressed from moving vertically and horizontally relative to the housing 110. The wheel dial fixing member 130 has a ring shape that is generally similar to a donut shape. The wheel dial fixing member 130 is provided to have a material or thickness that allows a predetermined elastic deformation.

The wheel dial fixing member 130 is formed of a material that has surface lubricity, such as polyoxymethylene, an acetal resin (polyacetal), or nylon (polyamide).

According to one embodiment of the present disclosure, the wheel dial fixing member 130 includes a base material 131 (hereinafter, a "body 131"), a first protrusion 132, and a second protrusion 133, and may further include a third protrusion 134.

The body 131 forms a closed loop that extends along the first ring-shaped structure 115 and/or the structure of the wheel dial member 120, is between the wheel dial member 120 and the housing 110, and is provided in a ring-shaped structure that has a predetermined thickness.

On the inner face, outer face, and another face (bottom face) of the body 131, first protrusions 132, second protrusions 133, and third protrusions 134 are formed to be spaced apart from each other, respectively.

These protrusions 132, 133 and 134 protrude from different portions of the body 131, respectively.

As will be described below, the first and second protrusions 132 and 133 are provided so as to rotatably fix the wheel dial member 120 to the housing 110, and may also prevent the wheel dial member 120 from being separated or moved vertically in relation to the housing 110. In addition, the third protrusion 134 is provided so as to prevent the wheel dial member 120 from being moved horizontally relative to the housing 110 when the wheel dial member 120 is mounted on the housing 110.

The first protrusion 132 protrudes from the body 131 in the fourth direction and is seated in the first recess 111 recessed in the third direction. A plurality of first protrusions 132 is provided on the inner periphery of the body 131 to be spaced apart from each other, and to protrude inwardly from the body 131. When the wheel dial fixing member 130 is coupled to the housing 110, the first protrusion 132 may be engaged in the first recess 111 of the housing 110. When the first protrusion 132 is engaged in the first recess 111, the body 131 may be fixed to the housing 110.

The second protrusion 133 is provided to protrude from the body 131 in the third direction and is seated in the second recess 121 recessed in the fourth direction. A plurality of second protrusions 133 is provided on the outer periphery of the body 131 to be spaced apart from each other, and to protrude outwardly from the body 131. The second protrusions 133 are formed to alternate with the mounting positions of the first protrusions 132. When the wheel dial fixing member 130 is coupled to the wheel dial member 120, the second protrusion 133 may be engaged in the second recess 121 of the housing 120. When the second protrusion 133 is engaged in the second recess 121, the body 131 may be fixed to the wheel dial member 120.

The first protrusions 132 and the second protrusions 133 may alternately protrude along the periphery of the body 131.

As described above, the wheel dial fixing member 130 is provided to fix the wheel dial member 120 to the housing 110, and to prevent a clearance from being generated in vertically and horizontally relative to the housing 110.

The wheel dial fixing member 130 is coupled to the wheel dial member 120, and then the wheel dial member 120, to which the wheel dial fixing member 130 is coupled, is mounted on, and coupled to, the top face of the housing 110.

Figure 9:
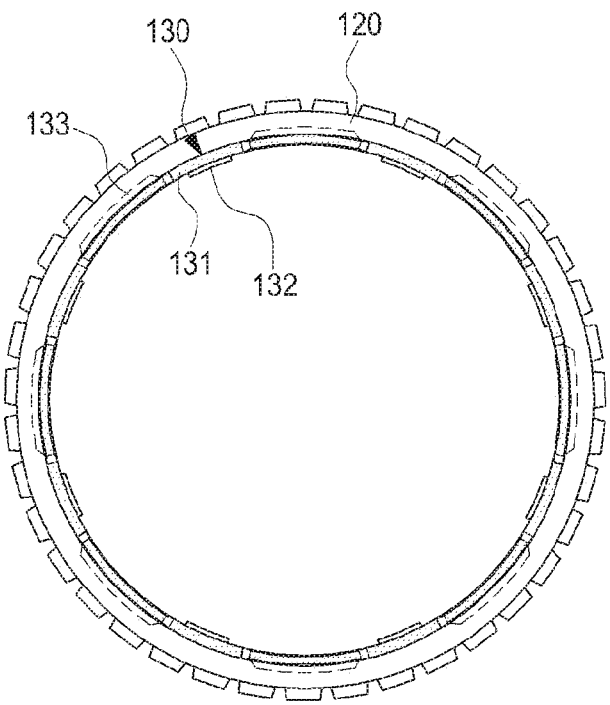
FIG. 9 illustrates when the wheel dial fixing member is coupled to the wheel dial member in the electronic device according to embodiments of the present disclosure.
Figure 10:
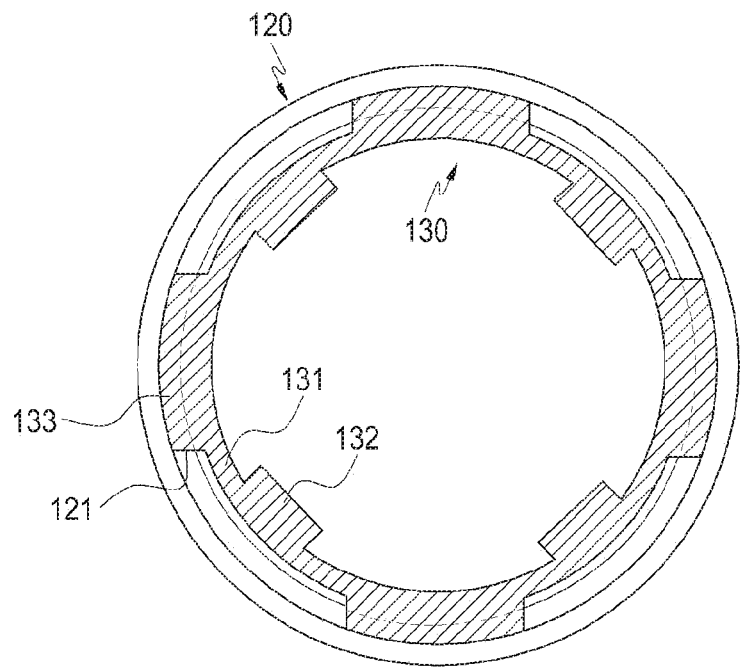
FIG. 10 illustrates when the wheel dial fixing member is coupled to the wheel dial member in the electronic device according to embodiments of the present disclosure.
Figure 11:
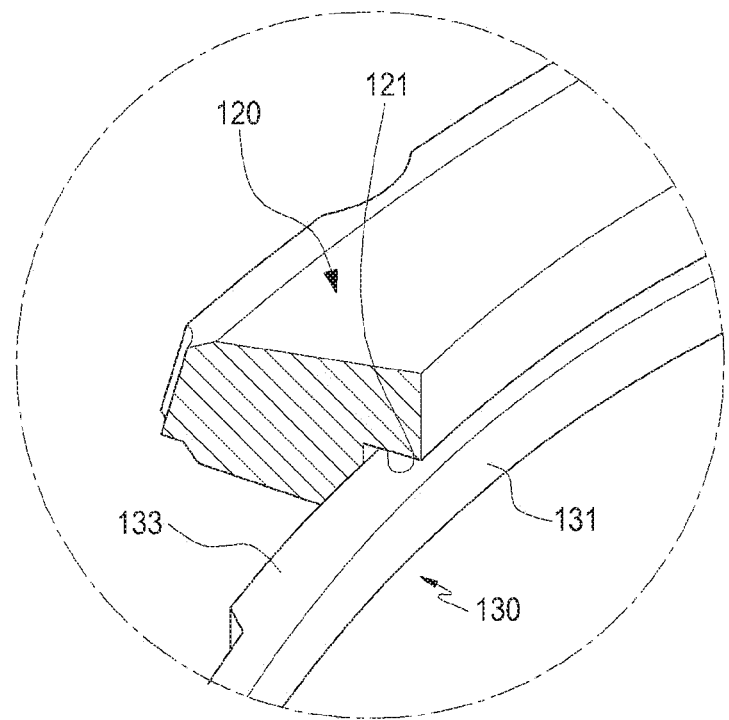
FIG. 11 illustrates when the wheel dial fixing member is coupled to the wheel dial member in the electronic device according to embodiments of the present disclosure.
Figure 12:
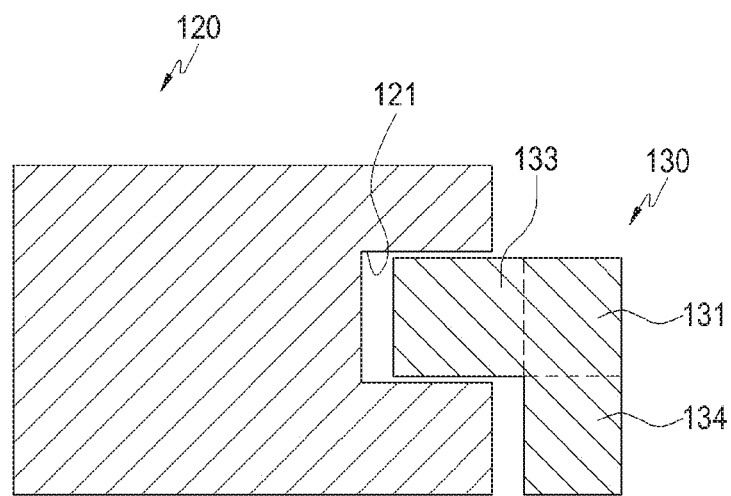
FIG. 12 illustrates a state in which the wheel dial fixing member is coupled to the wheel dial member in the electronic device according to embodiments of the present disclosure.

FIG. 9 illustrates when the wheel dial fixing member 130 is coupled to the wheel dial member 120 in the electronic device 100 according to embodiments of the present disclosure. FIG. 10 illustrates when the wheel dial fixing member 130 is coupled to the wheel dial member 120 in the electronic device 100 according to embodiments of the present disclosure. FIG. 11 illustrates when the wheel dial fixing member 130 is coupled to the wheel dial member 120 in the electronic device 100 according to embodiments of the present disclosure. FIG. 12 illustrates when the wheel dial fixing member 130 is coupled to the wheel dial member 120 in the electronic device 100 according to embodiments of the present disclosure.

Referring to FIGS. 9, 10, 11 and 12, the wheel dial fixing member 130 is seated on the wheel dial member 120. For example, second recesses 121, which are recessed to the inside of the wheel dial member 120, are formed on the inner peripheral face of the wheel dial member 120. A plurality of second protrusions 133, which protrude from the outer face of the body 131 of the wheel dial fixing member 130, is introduced into and seated in the second recesses 121, respectively.

As will be described below, the third protrusions 134 are provided to protrude from the body 131 in the direction perpendicular to the second protrusions 133 on the positions that are adjacent to the positions where the second protrusions 133 are provided, so that the third protrusions 134 are seated in the lower direction of the wheel dial member 120. Each of the third protrusions 134 is seated in a third recess 141 formed on a mating face between the wheel dial member 120 and the housing 110, and is provided to reduce a clearance, which may be generated when the wheel dial member 120 is mounted on the housing 110 such that the wheel dial member 120 may be prevented from moving horizontally relative to the housing 110.

Figure 13:
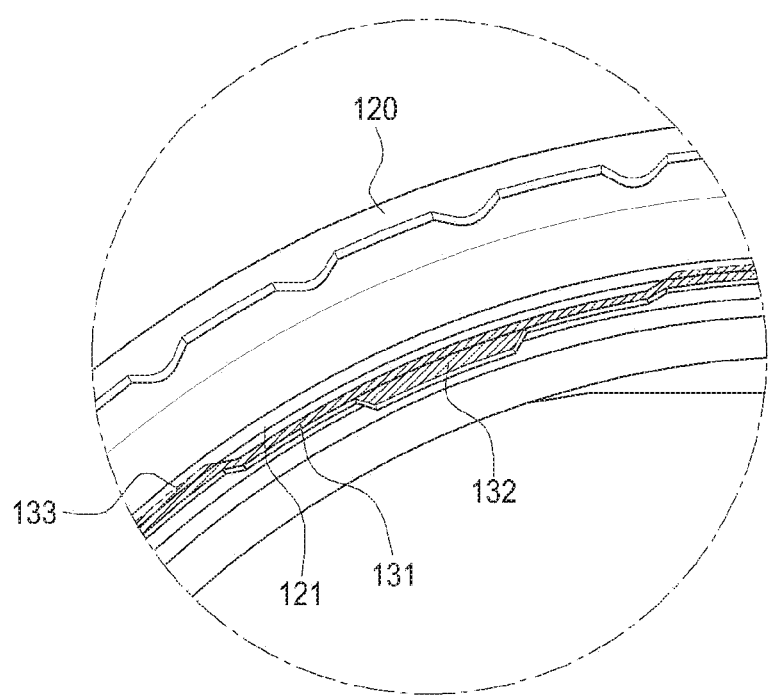
FIG. 13 illustrates a shape of the wheel dial fixing member when the wheel dial fixing member is coupled to the wheel dial member in the electronic device according to embodiments of the present disclosure.

FIG. 13 illustrates a shape of the wheel dial fixing member 130 when the wheel dial member 120, to which the wheel dial fixing member 130 is coupled, is coupled to the housing 110 in the electronic device 100 according to embodiments of the present disclosure.

Figure 14:
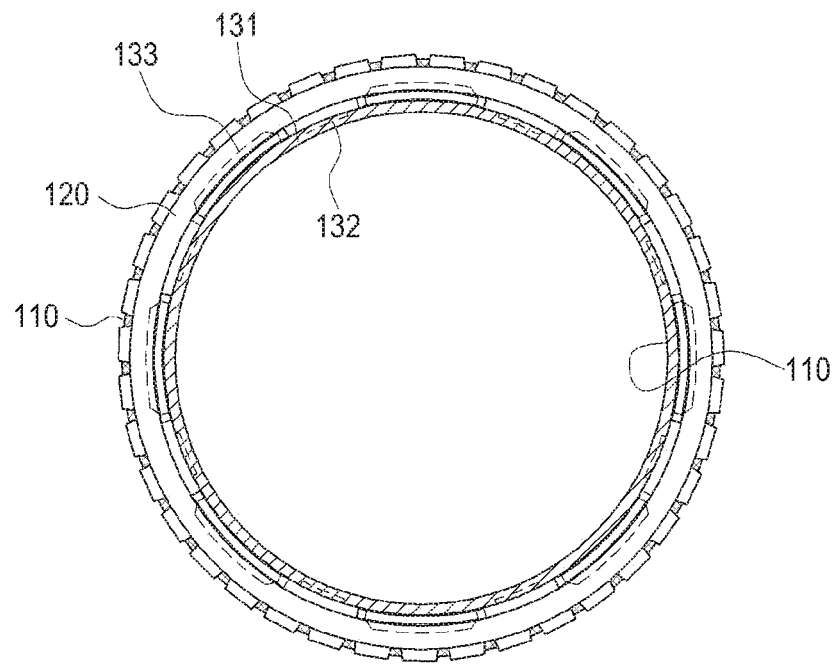
FIG. 14 illustrates the elastic deformation of the wheel dial fixing member when the wheel dial member, to which the wheel dial fixing member is coupled, is coupled to the housing in the electronic device according to embodiments of the present disclosure.

FIG. 14 illustrates an elastic deformation when the wheel dial fixing member 130 is coupled when the wheel dial member 120, to which the wheel dial fixing member 130 is coupled, is coupled to the housing 110 in the electronic device 100 according to embodiments of the present disclosure.

Figure 15:
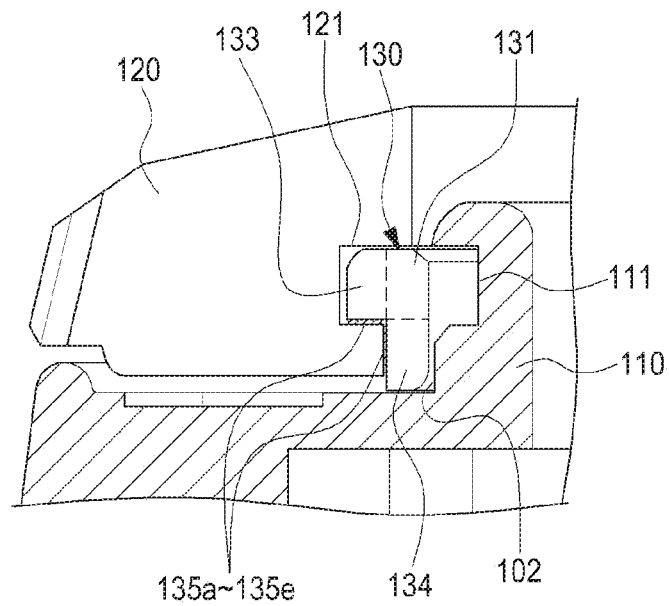
FIG. 15 illustrates when the wheel dial fixing member is coupled between the wheel dial member and the housing in the electronic device according to embodiments of the present disclosure.

FIG. 15 illustrates when the wheel dial fixing member 130 is coupled between the wheel dial member 120 and the housing 110 in the electronic device 100 according to embodiments of the present disclosure.

Figure 16:
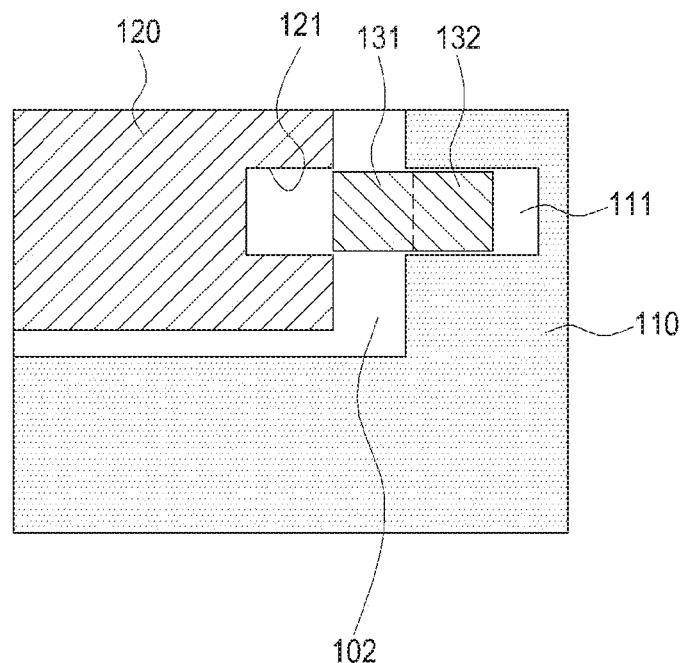
FIG. 16 illustrates when the wheel dial member and the housing are coupled to each other through the wheel dial fixing member in the electronic device according to embodiments of the present disclosure.

FIG. 16 illustrates when the wheel dial member 120 and the housing 110 are coupled to each other through the wheel dial fixing member 130 in the electronic device 100 according to embodiments of the present disclosure.

Figure 17:
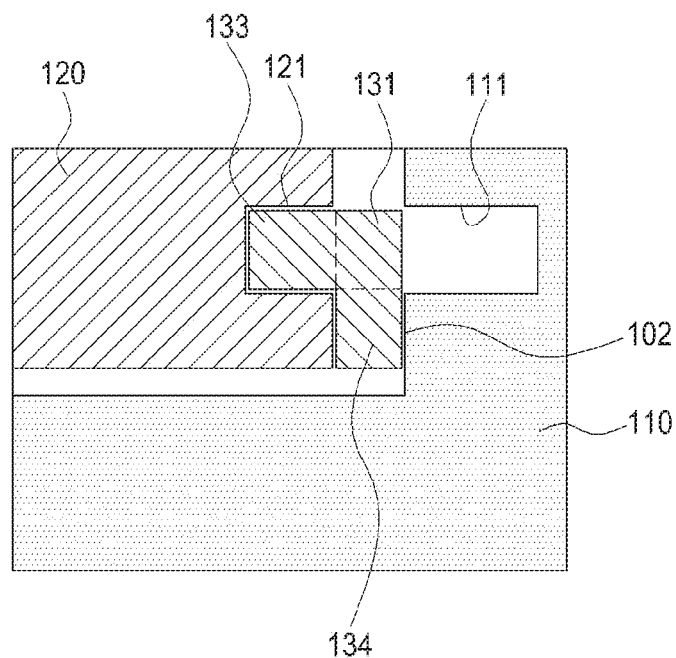
FIG. 17 is a first cross-sectional view illustrating a state in which the housing and the wheel dial member are coupled to each other through the wheel dial fixing member in the electronic device according to embodiments of the present disclosure.

FIG. 17 is a first cross-sectional view illustrating when the wheel dial member 120 and the housing 110 are coupled to each other through the wheel dial fixing member 130 in the electronic device 100 according to embodiments of the present disclosure.

Figure 18:
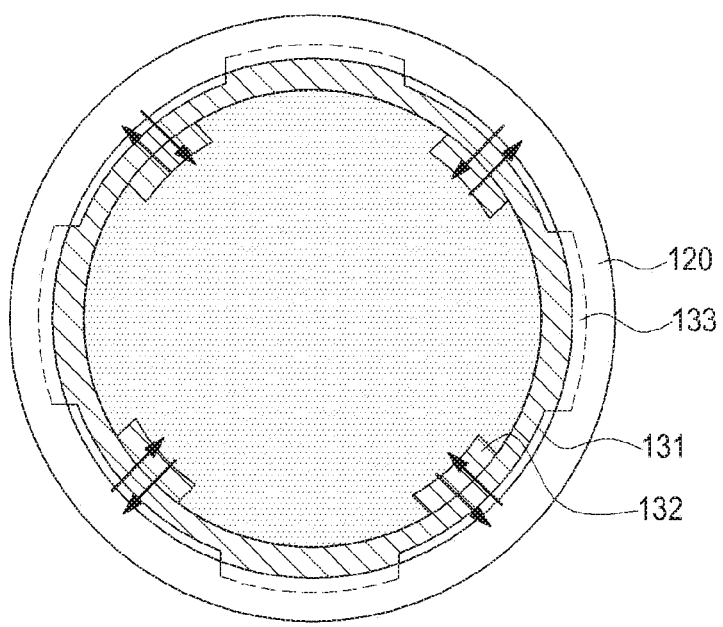
FIG. 18 is a second cross-sectional view illustrating a state in which the housing and the wheel dial member are coupled to each other through the wheel dial fixing member in the electronic device according to embodiments of the present disclosure.

FIG. 18 is a second cross-sectional view illustrating when the wheel dial member 120 and the housing 110 are coupled to each other through the wheel dial fixing member 130 in the electronic device 100 according to embodiments of the present disclosure.

Referring to FIGS. 13, 14, 15, 16, 17 and 18, the wheel dial member 120 is coupled to one face of the housing 110 when the wheel dial fixing member 130 is coupled to the wheel dial member 120. As disclosed above, the second protrusions 133 are formed to alternate with the first protrusions 132 such that when the second protrusions 133 are seated in the second recesses 121, a space may be generated that allows the body, which is formed with the first protrusions 132, to move to the second recess 121 side. Thus, when the wheel dial member 120 is mounted on the housing 110, the body 131 is elastically pushed to a second recess 121 side at a position where a first protrusion 132 protrudes, and when the first recess 111 of the housing 110 is positioned to be connected with the second recess 121 of the wheel dial member 120, the first protrusion 132, which has been pushed to the second recess 121 side, is introduced into the first recess 111 by a restoring force.

When the first protrusion 132 is introduced into the first recess 111 and the second protrusion 133 is introduced into the second recess 121, the wheel dial member 120 is suppressed from being separated vertically relative to the housing 110 such that the wheel dial member 120 may be rotatably fixed to the housing 110 through the wheel dial fixing member 130. That is, as the first protrusions 132 and the second protrusions 133 are seated in and fixed to the first recesses 111 and the second recesses 121, respectively, the wheel dial member 120 may be fixed to the housing to be suppressed from moving vertically relative to the housing.

Figure 19:
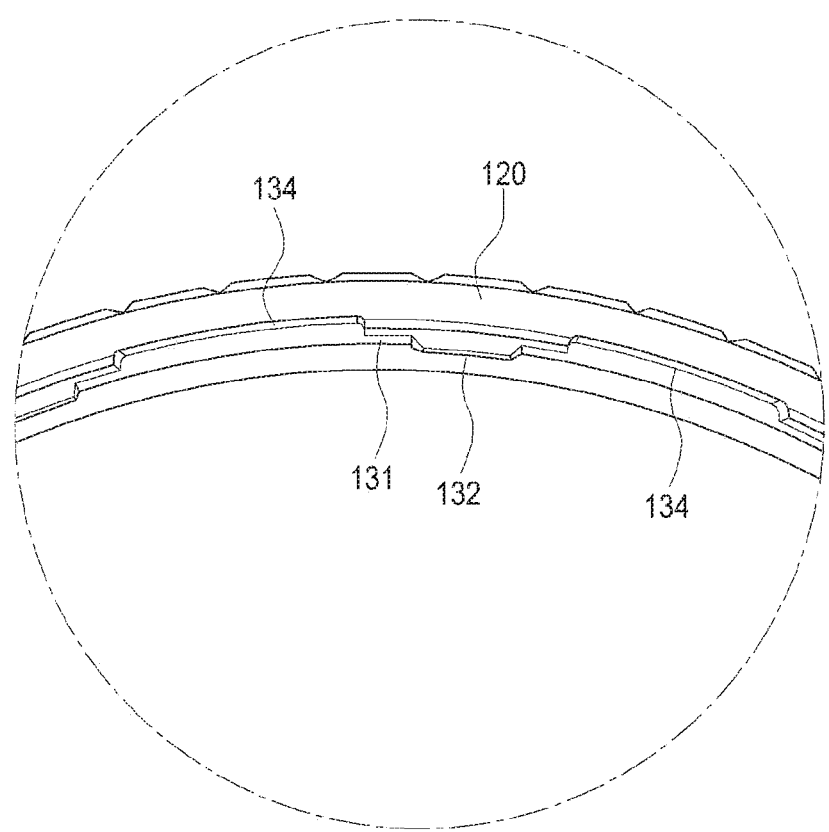
FIG. 19 illustrates the bottom side of the wheel dial fixing member that is mounted on the wheel dial member in the electronic device according to embodiments of the present disclosure.

FIG. 19 illustrates the bottom side of the wheel dial fixing member 130 that is mounted on the wheel dial member 120 in the electronic device 100 according to embodiments of the present disclosure.

Referring to FIG. 19, the wheel dial fixing member 130 further includes third protrusions 134.

The third protrusions 134 are provided at the positions that correspond to the mounting positions of the second protrusions 133 from the body 131. The third protrusions 134 are provided to protrude in a direction perpendicular to one face of the body 131, such as the protrusion direction of the second protrusions 133, and are seated in the third recesses 141 that are generated when the wheel dial member 120 is coupled to the housing 110, respectively. As the third protrusions 134 protrude in one direction of the body 131, such as downward, and is seated in the third recesses 141, respectively, the wheel dial member 120 is suppressed from moving horizontally, relative to the housing 110.

According to one embodiment of the present disclosure, the third protrusions 134 are provided at the positions that correspond to those of the second protrusions 133, and are provided on one face of the body 131 in a direction perpendicular to the second protrusions 133. Accordingly, the wheel dial fixing member 130, which is formed with the second protrusions 133 and the third protrusions 134, forms a "⊓" shape in a cross section or a "⊏" shape in a cross section. The third protrusions 134 are provided vertically at the positions that correspond to the mounting positions of the second protrusions 133 such that, when the second protrusions 133 are seated in the first recesses 111 of the housing 110 when seated in the second recesses 121 in the process of assembling the wheel dial fixing member 120 between the wheel dial member 120 and the housing 110, horizontal movement of the first protrusions 132 may be freely performed.

For example, when the first protrusions 132 are seated in the first recesses 111 of the housing 110 as the second protrusions 133 are seated in the second recesses 121 of the wheel dial member 120 first, the first protrusions 132 and the body 131, which is provided with the first protrusions 132, are moved toward the second recesses 121 and are elastically moved horizontally toward the first recesses 111 again such that the first protrusions 132 are seated in the first recesses 111, respectively. In order to assure that the first protrusions 132 are elastically moved toward the second recesses 121 and the first recesses 111, a vertical protrusion structure, which suppresses the movements of the first protrusion 132 and the body 131, is not formed on the body 131 that is provided with the first protrusions 132. Thus, the third protrusions 134 are formed on the portion where the second protrusions 133 are positioned.

Rather than assembling the wheel dial fixing member 130 to the wheel dial member 120 first, as described above, the wheel dial member 120 may be assembled when the wheel dial fixing member 130 is first assembled to the housing 110. In such a case, the third protrusions 134 are provided around the first protrusions 132 to prevent the horizontal movement.

As described above, when the wheel dial fixing member 130 is coupled to the housing 110 first, the third protrusions 134 are provided around the first protrusions 132 so that, when the wheel dial member 120 is subsequently coupled to the housing 110, on which the wheel dial fixing member 130 is seated, the second protrusions 133 may be moved, and when the wheel dial member 120, which includes the wheel dial fixing member 130, is subsequently assembled to the housing 110, the assembly can be smoothly performed. Accordingly, depending on the assembly sequence of the wheel dial fixing member 130 to a constituent member depending on whether the wheel dial fixing member 130 is assembled to the wheel dial member 120 first, or is assembled to the housing 110 first, the mounting positions of the third protrusions 134 may vary.

Figure 20:
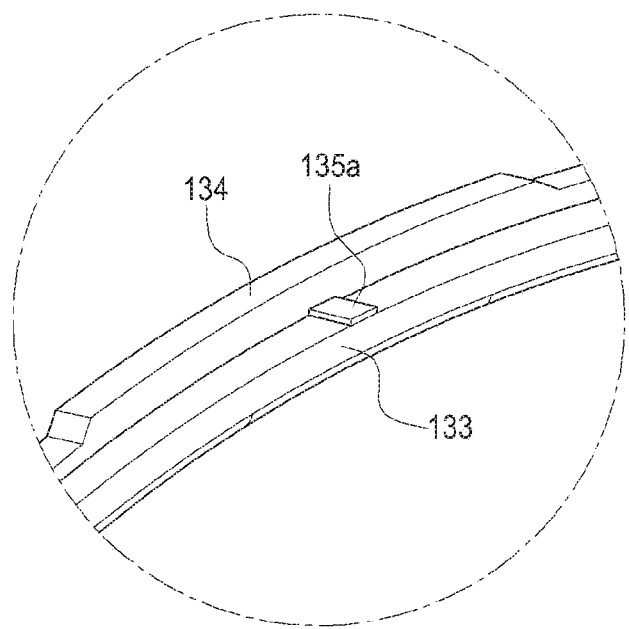
FIG. 20 illustrates when an embossed portion is formed on one face of each of the second and third protrusions of the wheel dial fixing member in the electronic device according to embodiments of the present disclosure.
Figure 21:
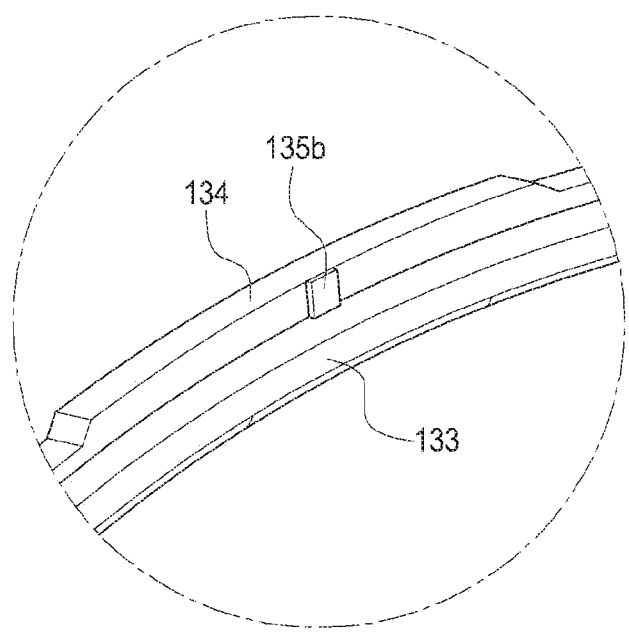
FIG. 21 illustrates when an embossed portion is formed on one face of each of the second and third protrusions of the wheel dial fixing member in the electronic device according to embodiments of the present disclosure.
Figure 22:
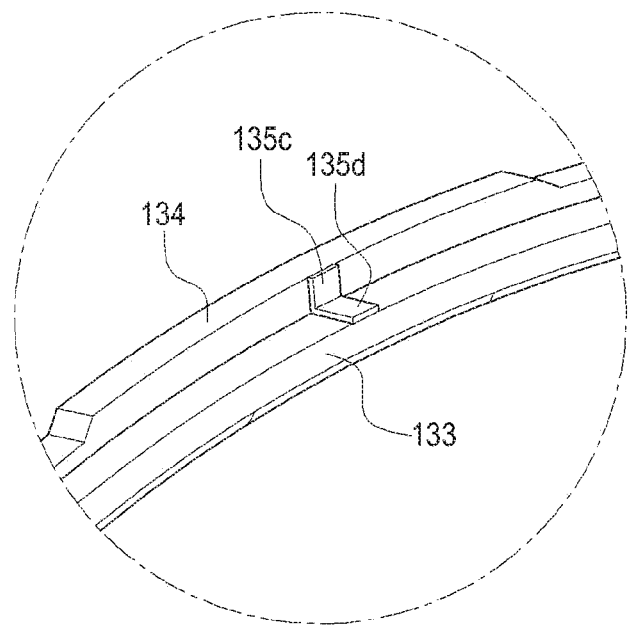
FIG. 22 illustrates when an embossed portion is formed on one face of the second and third protrusions of the wheel dial fixing member in the electronic device according to embodiments of the present disclosure.
Figure 23:
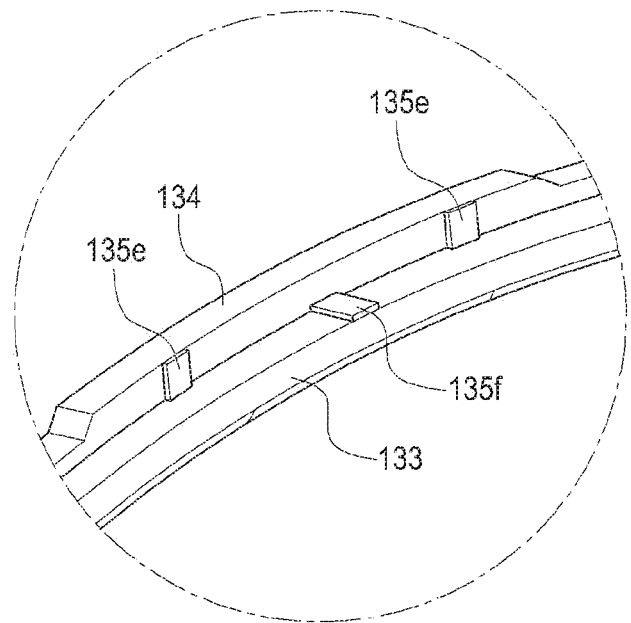
FIG. 23 illustrates when an embossed portion is formed on one face of the second and third protrusions of the wheel dial fixing member in the electronic device according to embodiments of the present disclosure.

FIG. 20 illustrates when an embossed portion is formed on one face of the second and third protrusions 133 and 134 of the wheel dial fixing member 130 in the electronic device 100 according to embodiments of the present disclosure. FIG. 21 illustrates when an embossed portion is formed on one face of the second and third protrusions 133 and 134 of the wheel dial fixing member 130 in the electronic device 100 according to embodiments of the present disclosure. FIG. 22 illustrates when an embossed portion is formed on one face of the second and third protrusions 133 and 134 of the wheel dial fixing member 130 in the electronic device 100 according to embodiments of the present disclosure. FIG. 23 illustrates when embossed portions are formed on one face of the second and third protrusions 133 and 134 of the wheel dial fixing member 130 in the electronic device 100 according to embodiments of the present disclosure.

Referring to FIGS. 20, 21, 22 and 23, one or more embossed portions 135a, 135b, 135c, 135d, 135e, and 135f are formed to protrude on one face of the second protrusion 133 or the third protrusion 134. For example, as illustrated in FIG. 20, an embossed portion 135a is formed at a predetermined position on the inner face of the second protrusion 133. As illustrated in FIG. 21, an embossed portion 135b is formed at a predetermined position on the inner face of the third protrusion 134. As illustrated in FIG. 22, embossed portions 135c and 135d are formed in a "┐" shape at predetermined positions on the inner face of the second and third protrusions 133 and 134. As illustrated in FIG. 22, embossed portions 135c and 135d are formed at predetermined positions on the inner face of the second and third protrusions 133 and 134 to alternate with each other or to be spaced away from each other.

Alternatively, the embossed portions 135a to 135e may be formed to protrude on the entire face of one or both of the second protrusion 133 and the third protrusion 134.

According to one embodiment, when the wheel dial fixing member 130 is mounted between the wheel dial member 120 and the housing 110, the embossed portions 135a to 135f cause these members to maintain a close contact state without generating a gap therebetween, thereby preventing the wheel dial member 120 from moving from the housing 110 due to a clearance. The embossed portions 135a to 135f may be integrally formed with the wheel dial fixing member 130 in the process of molding, such as when molding the wheel dial fixing member 130. Alternatively, the embossed portions 135a to 135f may be implemented by fixedly coupling a material, which is different from that of the wheel dial fixing member 130, to the wheel dial fixing member 130. For example, the embossed portions 135a to 135e may be implemented such that an elastic material, such as sponge or rubber, is coupled to the second protrusions 133 or third protrusions 134 of the wheel dial fixing member 130.

FIGS. 24A, 24B, 24C and 24D illustrate when a wheel dial member 120a is coupled to a housing 110a, in an electronic device 100a according to embodiments of the present disclosure.

Figure 24A:
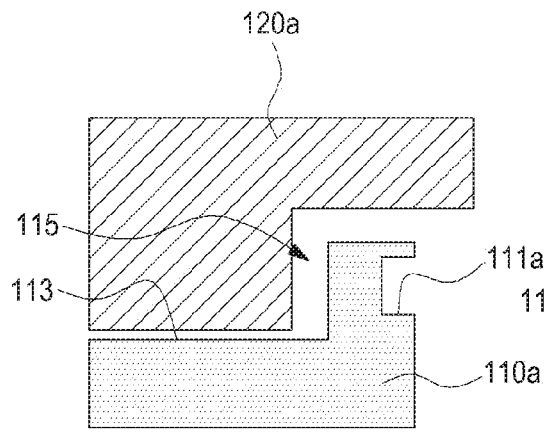
FIGS. 24A, 24B, 24C and 24D illustrate when the wheel dial member is coupled to the housing in the electronic device according to embodiments of the present disclosure.

Referring to FIG. 24A, a first hook portion 111a is provided inside the housing 110a such that a first protrusion 132a of the wheel dial fixing member 130 to be described is seated therein.

Figure 24B:
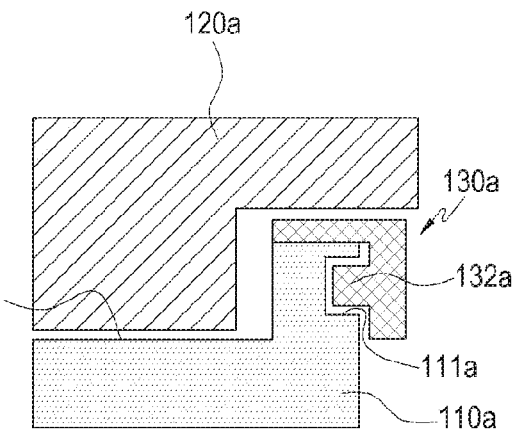
Figure 24C:
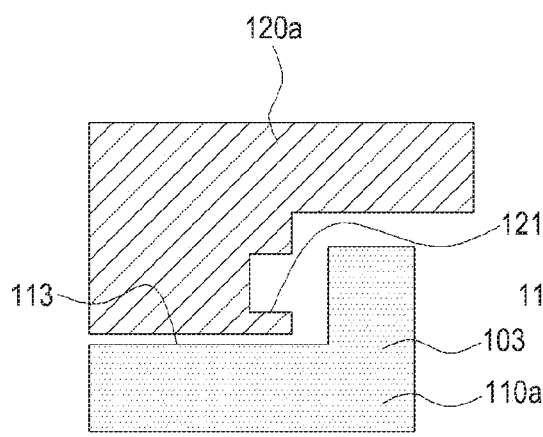
Figure 24D:
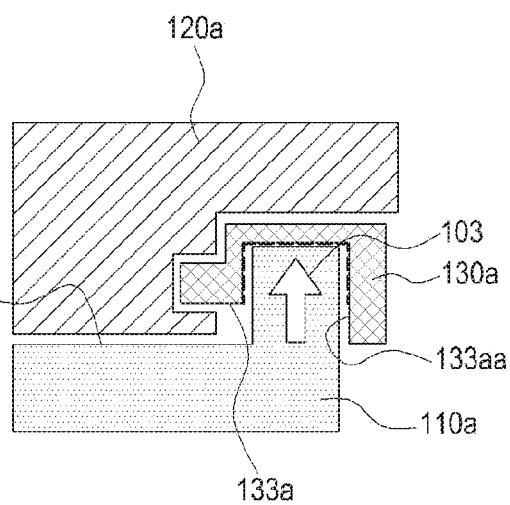

According to one embodiment of the present disclosure, the first hook portion 111a forms a hook loop in the fourth direction that is directed toward the center of the first ring-shaped structure 115. That is, the first hook portion 111a is provided in the form of a protrusion that protrudes upwardly. In FIG. 24C, in the housing 110a, an insertion protrusion 103 protrudes from the first portion 113 of the first ring-shaped structure 115 in the first direction. In FIGS. 24B and 24D, the insertion protrusion 103 is formed on a position that corresponds to the mounting position of the first protrusion 132a of the wheel dial fixing member 130a to be drawn into a recess portion 133aa that is formed to be recessed in the first direction at the position of the first protrusion 132a such that the wheel dial member 120a can be prevented from moving horizontally of the housing 110a.

In FIG. 24C, the wheel dial member 120a is provided with a second hook portion 121a that is recessed in the fourth direction along the inner periphery of the wheel dial member 120a. The second hook portion 121a forms a hook face in the fourth direction, and the second protrusion 133a protruding in the fourth direction of the wheel dial fixing member 130a to be described later is seated in the second hook portion 121a.

Figure 25:
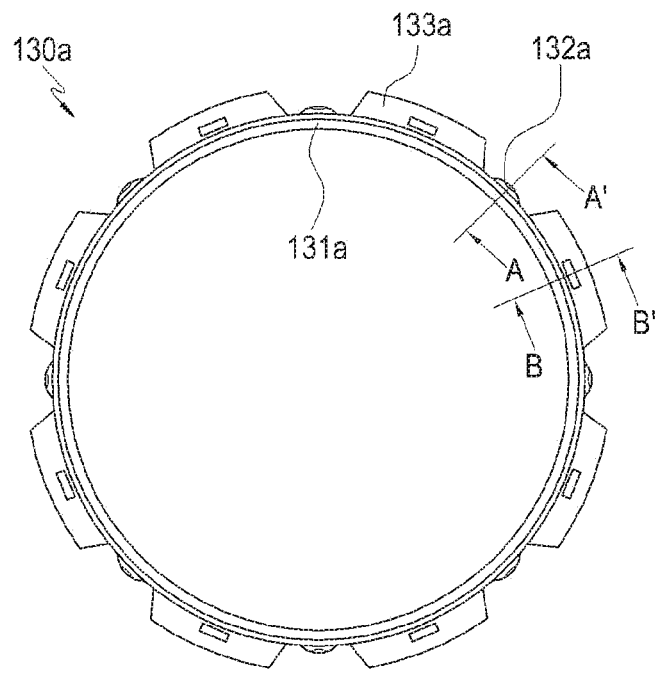
FIG. 25 illustrates an upper plan view of a wheel dial fixing member according to one embodiment, in an electronic device according to embodiments of the present disclosure.
Figure 26:
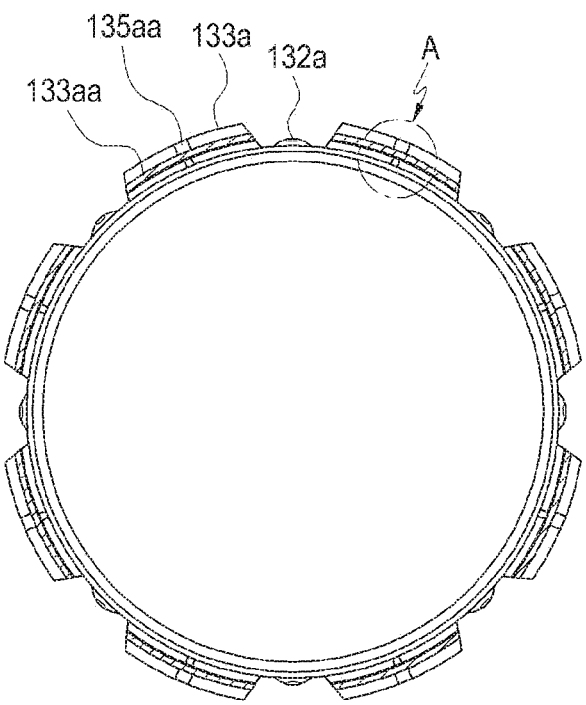
FIG. 26 illustrates a bottom plan view of a wheel dial fixing member according to one embodiment, in an electronic device according to embodiments of the present disclosure.
Figure 27:
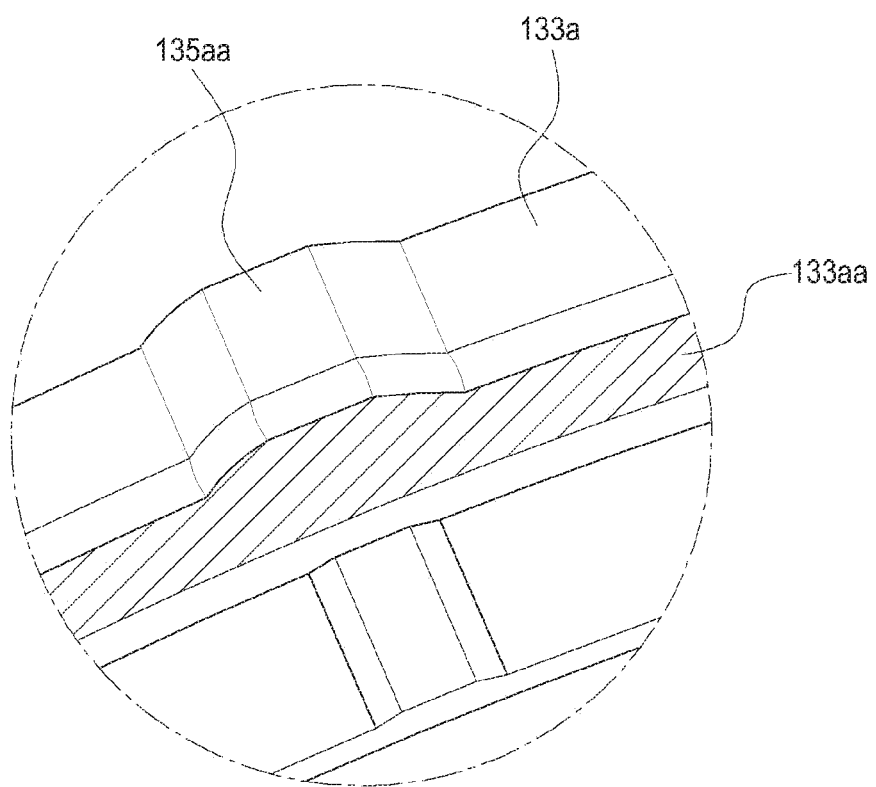
FIG. 27 is a cross-sectional view taken along line A-A' in FIG. 25.
Figure 28:
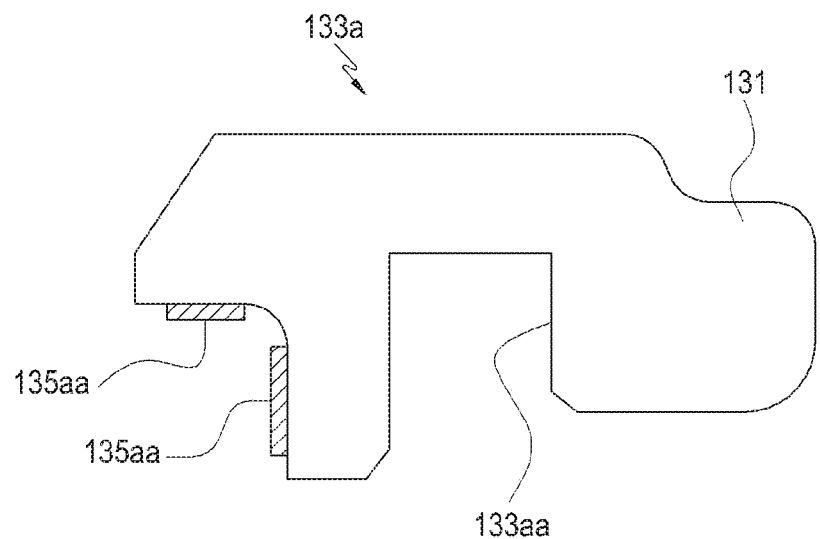
FIG. 28 is a cross-sectional view taken along line B-B' in FIG. 25.

FIG. 25 illustrates a top plan view of the wheel dial fixing member 130a in the electronic device 100a according to embodiments of the present disclosure. FIG. 26 illustrates a bottom plan view of the wheel dial fixing member 130a in the electronic device 100a according to embodiments of the present disclosure. FIG. 27 is a cross-sectional view taken along line A-A' in FIG. 25. FIG. 28 is a cross-sectional view taken along line B-B' in FIG. 25.

Referring to FIGS. 25, 26, 27 and 28, the wheel dial fixing member 130a is between the housing 110a and the wheel dial member 120a, and around the first ring-shaped structure 115, show in FIGS. 4A, 4B and 4C, such that when the wheel dial member 120a is coupled to the housing 110a, the wheel dial member 120a is rotatably fixed to the housing 110a, and is suppressed from moving vertically and horizontally relative to the housing 110a. The wheel dial fixing member 130a has a ring shape that is generally similar to a donut shape, and is provided to have a material or thickness that allows a predetermined elastic deformation.

The wheel dial fixing member 130a is formed of a material that has surface lubricity, such as polyoxymethylene, an acetal resin (polyacetal), and nylon (polyamide).

In FIG. 25, the wheel dial fixing member 130a includes a body 131a, a first protrusion 132a, and a second protrusion 133a.

In FIG. 25, the body 131a forms a closed loop that extends along the first ring-shaped structure 115 and/or the structure of the wheel dial member 120a. The body 131a is between the wheel dial member 120a and the housing 110a (shown in FIGS. 24A to 24D), and is provided in a ring-shaped structure that has a predetermined thickness. In FIGS. 25, 26, 27 and 28, along the outer periphery of the body 131a, a plurality of first protrusions 132a and second protrusions 133a are formed to be spaced apart from each other, respectively, and are provided so as to rotatably fix the wheel dial member 120a to the housing 110a, and to prevent the wheel dial member 120a from being separated or moved vertically relative to the housing 110a.

In FIGS. 26, 27 and 28, a recess 133aa is formed on the second protrusion 133a, and an insertion protrusion 103, shown in FIGS. 24C and 24D, protruding from the housing 110a is seated in such recess 133aa. Thus, the wheel dial member 120a is provided to prevent the housing 110a from moving horizontally when mounted on the housing 110a.

In FIGS. 25 and 26, the first protrusion 132a and the second protrusion 133a of the wheel dial fixing member 130a are formed to alternate with each other and protrude in the same direction, such as the outward direction of the body 131a.

More specifically, in FIGS. 25 and 26, the first protrusion 132a protrudes from the body 131a in the fourth direction, which is opposite to the third direction, and the first protrusion 132a is at least partially hooked to the first hook portion 111a. A plurality of first protrusions 132a is provided on the inner periphery of the body 131a to be spaced apart from each other, and to protrude inwardly from the body 131a. When the wheel dial fixing member 130a is coupled to the housing 110a, the first protrusion 132a are hooked to the first hook portion of the housing 110a, and the body 131a is fixed to the housing 110a.

More specifically, the second protrusion 133a protrudes from the body 131a in the fourth direction, which is opposite to the third direction, and is at least partially hooked to the second hook portion 121a. A plurality of second protrusions 133a is provided on the outer periphery of the body 131a to be spaced apart from each other, and to protrude outwardly from the body 131a. The second protrusion 133a is positioned between the first protrusion 132a and another first protrusion 132a that neighbors the first protrusion 132a such that the first protrusion 132a and the second protrusion 133a are provided to alternate with each other along the outside of the body 131a. The second protrusions 133a are formed to alternate with the mounting positions of the first protrusions 132a. When the wheel dial fixing member 130a is coupled to the wheel dial member 120a, the second protrusion 133a is hooked to the second hook portion of the wheel dial member 120a, and the body 131a is fixed to the wheel dial member 120a.

In FIGS. 26, 27 and 28, on one face of the body 131a, such as the bottom face of the second protrusion 133a, a recess 133aa is formed either on the entire bottom face or a portion of the bottom face of the second protrusion 133a. The recess 133aa is formed to be recessed from the body 131a in the first direction, and is provided at the position that corresponds to the mounting position of the second protrusion 132a from the body 131a.

As briefly described above, inside the housing 110a, an insertion protrusion 103 protrudes from the housing 110a in the first direction and between the first hook portion 111a and the first hook portion 111a. In addition, the insertion protrusion 103 (shown in FIGS. 24C and 24D) is formed on a position that corresponds to the mounting position of the first protrusion 132a of the wheel dial fixing member 130a, and is provided so that the insertion protrusion 103 is seated in the recess 133aa that is formed to be recessed in the first direction to the position of the body 131a that is formed with the first protrusion 132a.

Thus, when the second protrusion 133a is seated on the housing 110a when seated in the second hook portion 121a in the assembly process of the wheel dial fixing member 120 between the wheel dial member 120a and the housing 110, the first hook portion 111a is mounted in the space between the second hook portion 121a and the first protrusion 132a. In order to ensure that the first hook portion 111a, which protrudes in the third direction, is seated on the first protrusion 132a, which protrudes in the fourth direction, the first hook portion 111a is elastically moved to a position adjacent to the inner face of the wheel dial member 130a, and at the moment of facing the first protrusion 132a, the first hook portion 111a is hooked and fixed to the first protrusion 132a while being moved toward the first protrusion 132a by a restoring force.

Accordingly, since the first hook portion 111a elastically moves between the second hook portion 121a and the first protrusion 132a, the insertion protrusion 103 is provided at a position that corresponds to the position of the second hook portion 121a, rather than the position of the first hook portion 111a. For example, the insertion protrusion 103 is between the first hook portion 111a and the first hook portion 111a, or is formed at a position that corresponds to the second protrusion 133a that is formed to alternate with the first hook portion 111a.

Alternatively, rather than assembling the wheel dial fixing member 130a to the wheel dial member 120a first as described above, the wheel dial member 120a may be assembled when the wheel dial fixing member 130a is first assembled to the housing 110a. In such a case, the insertion protrusions 103 are provided around the first protrusions 132a to prevent the horizontal movement. When the wheel dial fixing member 130a is coupled to the housing 110a first as described above, the second protrusion 133a is movable, and the wheel dial member 120a, which is subsequently provided with the wheel dial fixing member 130a, may be smoothly assembled when the wheel dial member 120a is assembled to the housing 110a.

Accordingly, depending on whether the wheel dial fixing member 130a is first assembled to the wheel dial member 120a or to the housing 110a, the mounting positions of the third protrusions 134a may vary.

In such a case, the third protrusions 134a are provided around the first protrusions 132a to prevent the horizontal movement. As described above, when the wheel dial fixing member 130a is coupled to the housing 110a first, the third protrusions 134a are provided around the first protrusions 132a so that, when the wheel dial member 120a is subsequently coupled to the housing 110a, on which the wheel dial fixing member 130a is seated, the second protrusions 133a are moved, and when the wheel dial member 120a, which includes the wheel dial fixing member 130a, is subsequently assembled to the housing 110a, the assembly can be smoothly performed.

In addition, in the housing 110a, the insertion protrusion 103 is provided to be introduced into the recess 133aa on the position that corresponds to the recess 133aa so as to limit a horizontal clearance of the wheel dial member 120a. That is, when the wheel dial fixing member 130a is coupled to the housing 110a when the wheel dial fixing member 130a is seated on the wheel dial member 120a, the insertion protrusion 103 protruding from the housing 110a is seated on the body 131a of the wheel dial fixing member 130a, such as in the recess 133aa formed on the bottom face of the second protrusion 133a. When the wheel dial member 120a, to which the wheel dial fixing member 130a is coupled, is coupled to the housing 110a, the insertion protrusion 103 is seated in the recess 133aa, and as a result, the wheel dial fixing member 130a prevents the generation of vertical and horizontal clearances of the housing 110a and fixes the wheel dial member 120a to the housing 110a.

As described above, the first protrusions 132a and the second protrusions 133a are provided along the outer periphery of the body 131a to alternate with each other, such that the first protrusions 132a protrude less than the second protrusions 133a. Thus, when the wheel dial fixing member 130a is disposed between the housing 110a and the wheel dial member 120a, a predetermined space is formed between the first protrusion 132a and the inner face of the wheel dial member 120a, and the first hook portion 111a of the housing 110a is provided to penetrate the first hook portion 111a of the housing 110a and is hooked to the first hook portion 111a.

The wheel dial fixing member 130a is coupled to the wheel dial member 120a, and is then mounted on and coupled to the periphery of the housing 110a.

Figure 29:
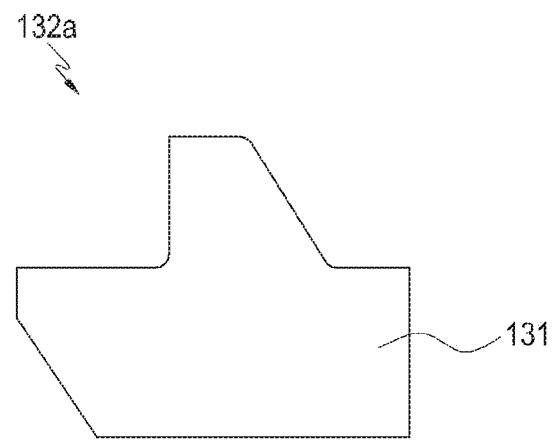
FIG. 29 illustrates when the wheel dial fixing member is coupled to the wheel dial member in the electronic device according to embodiments of the present disclosure.

FIG. 29 illustrates a state in which the wheel dial fixing member 130a is coupled to the wheel dial member 120a in the electronic device 100a according to embodiments of the present disclosure.

Figure 30:
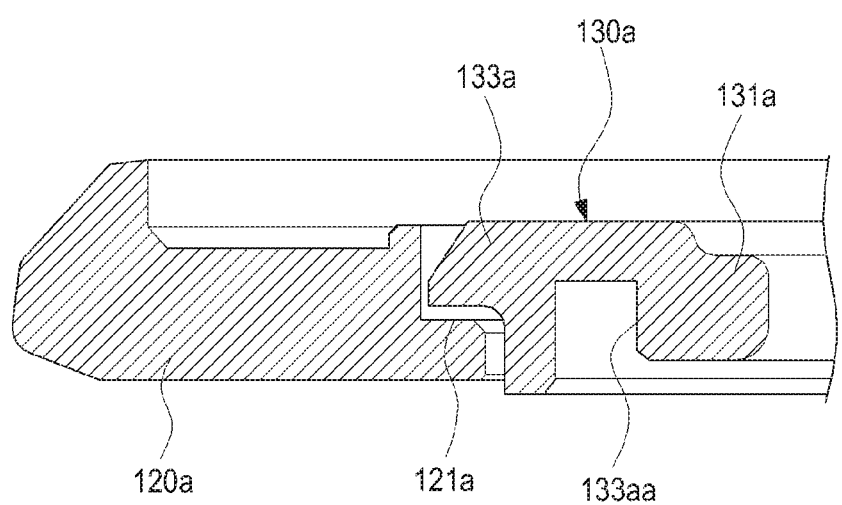
FIG. 30 is a first cross-sectional view illustrating when the housing and the wheel dial member are coupled to each other through the wheel dial fixing member in the electronic device according to embodiments of the present disclosure.

FIG. 30 is a first cross-sectional view illustrating a state in which the wheel dial member 120a and the housing 110a are coupled to each other through the wheel dial fixing member 130a in the electronic device 100a according to embodiments of the present disclosure.

Figure 31:
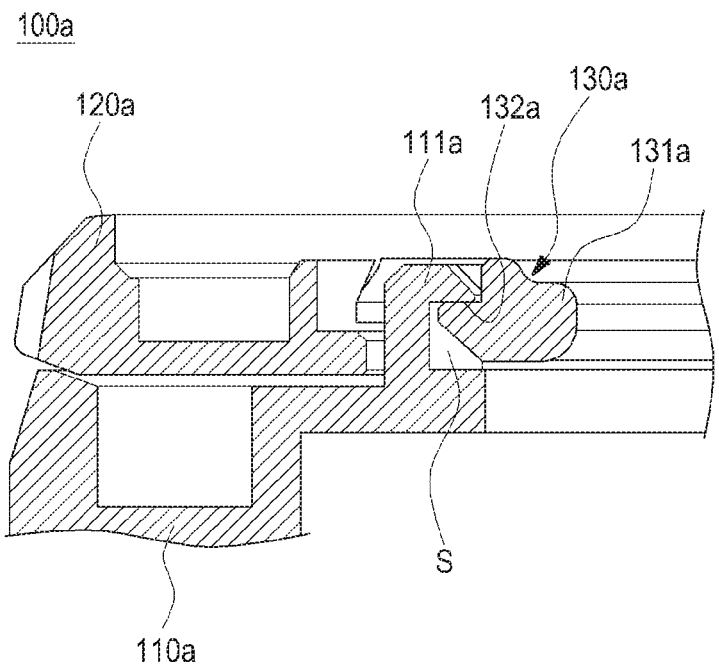
FIG. 31 is a second cross-sectional view illustrating when the housing and the wheel dial member are coupled to each other through the wheel dial fixing member in the electronic device according to embodiments of the present disclosure.

FIG. 31 is a second cross-sectional view illustrating a state in which the wheel dial member 120a and the housing 110a are coupled to each other through the wheel dial fixing member 130a in the electronic device 100a according to embodiments of the present disclosure.

Figure 32:
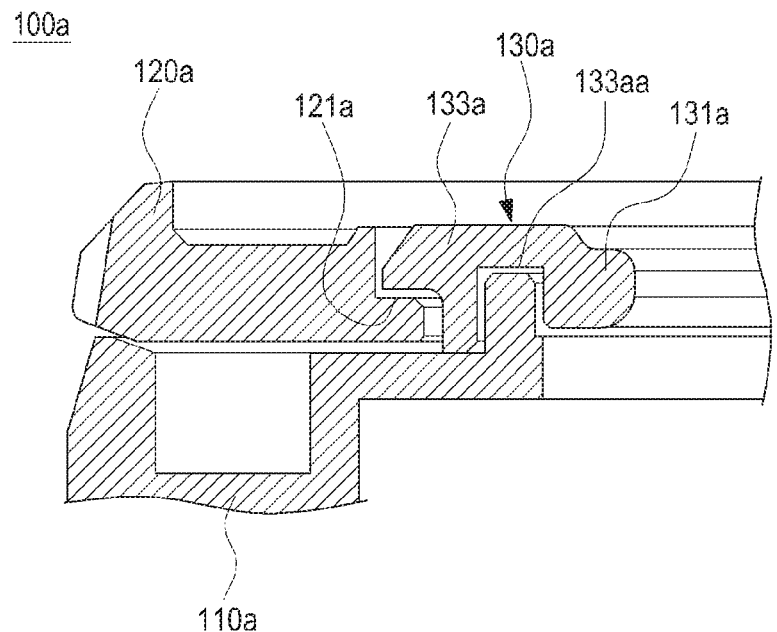
FIG. 32 is a cross-sectional view of another portion in the first cross-sectional view illustrating when the housing and the wheel dial member are coupled to each other through the wheel dial fixing member in the electronic device according to embodiments of the present disclosure.

FIG. 32 is a cross-sectional view of another portion in the first cross-sectional view illustrating a state in which the wheel dial member 120a and the housing 110a are coupled to each other through the wheel dial fixing member 130a in the electronic device 100a according to embodiments of the present disclosure.

Referring to FIGS. 29, 30, 31 and 32, the housing 110a is provided with a first hook 111a that penetrates between the wheel dial member 120a and the first protrusion 132a to protrude to the first protrusion 132a side such that the first protrusion 132a is fixedly hooked to the first hook 111a. In addition, the wheel dial member 120a is provided with a second hook portion 121a, which is introduced in a "⌴" shape in the inner face such that the second protrusion 133a is fixedly fixed to the second hook portion 121a. In addition, as described above, the housing 110a is formed with an insertion protrusion 103 to protrude toward the second protrusion 133a to the position that is corresponds to the recess 133aa.

Since the first protrusion 132a and the second protrusion 133a are fixedly hooked to the first hook portion 111a and the second hook portion 121a, respectively, it is possible to fix the wheel dial member 120a to the housing and to suppress the wheel dial member 120a from being separated or moved vertically relative to the housing 110a. In addition, as the insertion protrusion 103 is seated and engaged in the recess 133aa, it is possible to prevent the wheel dial member 120a from being moved from the housing 110a horizontally relative to the housing 110a.

In the electronic device 100a according to the second embodiment of the present disclosure, the wheel dial member 120a is mounted on one face of the housing 110a when the wheel dial fixing member 130a is coupled to the wheel dial member 120a.

As described above, as the second protrusion 133a is formed to alternate with the first protrusion 132a and to be longer than the first protrusion 132a, when the second protrusion 133a is hooked to the second hook portion 121a and thus, the wheel dial fixing member 130a is coupled to the wheel dial member 120a, the first protrusion 132a is positioned to be spaced apart from the inner side of the wheel dial member 120a by a predetermined length so that a space is formed between the first protrusion 132a and the inner side of the wheel dial member 120a. Thus, as shown in FIG. 31, when the wheel dial member 110a, which is mounted with the wheel dial fixing member 130a, is mounted on the housing 110a, the first protrusion 132a may pass through the space S to be engaged to be hooked to the first hook portion. Accordingly, as the first protrusion 132a is hooked to the first hook portion 111a when the second protrusion 133a is hooked to the second hook portion 121a, the wheel dial member 120a may be fixed not to be vertically separated from the housing 110a and is suppressed from moving vertically relative to the housing 110a.

Figure 33:
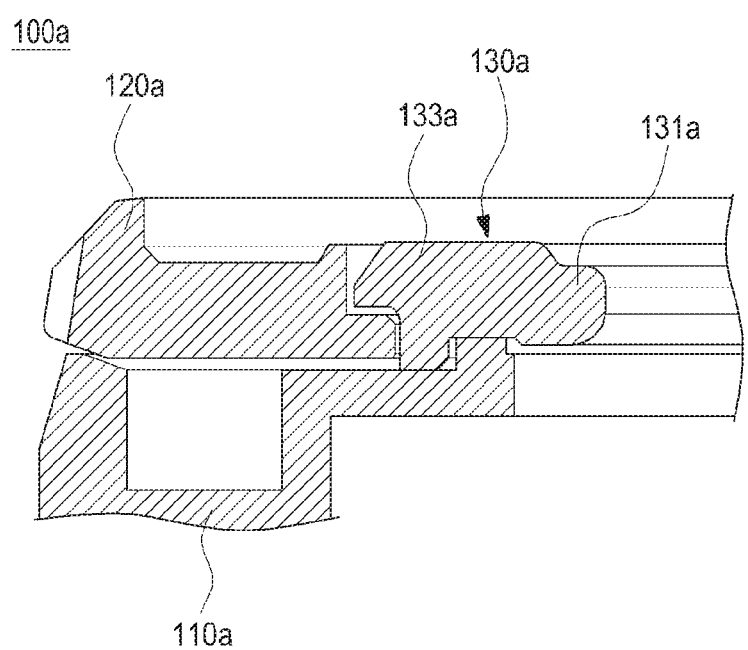
FIG. 33 illustrates an embossed portion in an electronic device according to embodiments of the present disclosure.
Figure 34A:
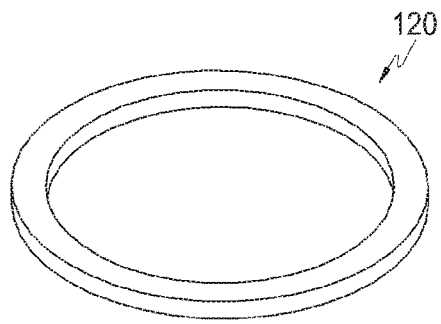
FIGS. 34A, 34B, 34C and 34D schematically illustrate a coupling order of the wheel dial member, the wheel dial fixing member, and the housing in the electronic device according to embodiments of the present disclosure.
Figure 34B:
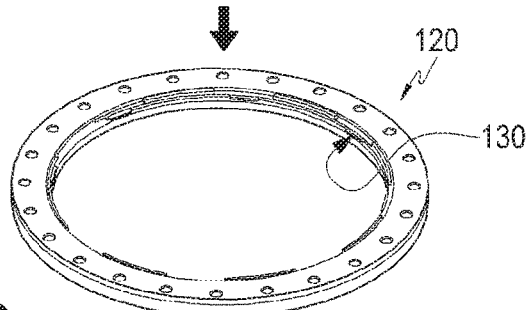
Figure 34C:
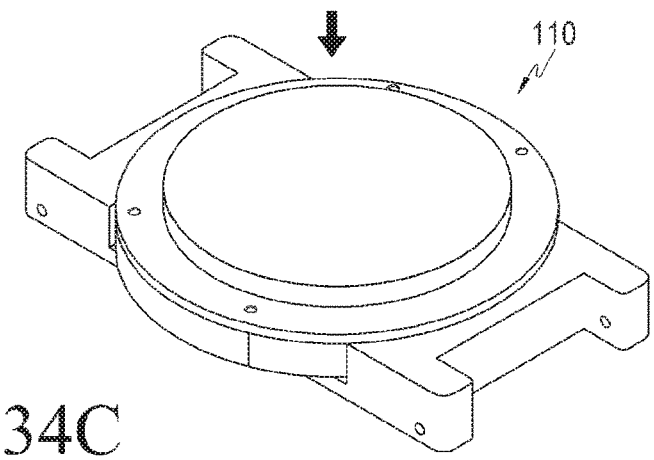
Figure 34D:
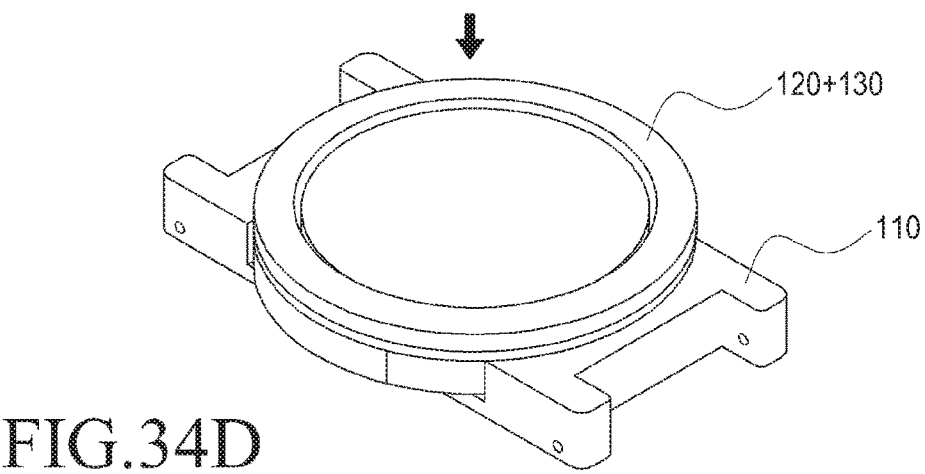

FIG. 33 schematically illustrates an embossed portion 133aa in the electronic device 100a according to embodiments of the present disclosure.

Referring to FIG. 33, one or more embossed portions 133aa are provided to protrude on the contact face of the wheel dial fixing member where the second protrusion 133a and the first hook portion are hooked to be in contact with each other.

For example, one or more embossed portions 133aa (shown in FIG. 32) are formed to protrude at predetermined positions on the inner face of the second protrusion 133a or the inner face of the body 131a that is connected with the inner face of the second protrusion 133a. For example, the embossed portions 133aa are formed at predetermined positions on the inner face of the second protrusion 133a, and on predetermined positions on the inner face of the body 131a that is connected with the inner face of the second protrusion 133a, and are formed in a "⌐" shape at predetermined positions on the inner face of the second protrusion 133a or the inner face of the body 131a that is connected with the inner face of the second protrusion 133a. In addition, one or more embossed portions 133aa are formed on the inner face of the second protrusion 133a or the inner face of the body 131a that is connected with the inner face of the second protrusion 133a, to alternate with each other or to be spaced apart from each other.

Alternatively, one or more embossed portions 133aa may be formed to protrude at predetermined positions on the entire face of the second protrusion 133a and/or the entire inner face of the body 131a that is connected with the second protrusion 133a.

When the wheel dial fixing member 130a is mounted between the wheel dial member 120a and the housing 110a, these members may maintain a close contact state without generating a gap therebetween, thereby preventing the wheel dial member 120a from moving from the housing 110a due to a clearance. According to one embodiment of the present disclosure, the embossed portion 133aa may be integrally formed with the wheel dial fixing member 130a in the molding process thereof at the time of molding the wheel dial fixing member 130a, or may be implemented by fixedly coupling a material, which is different from the that of the wheel dial fixing member 130a, to the wheel dial fixing member 130a. The embossed portion 133aa may be implemented such that an elastic material, such as sponge or rubber, is coupled to the second protrusion 133a of third protrusion of the wheel dial fixing member 130a.

FIGS. 34A, 34B, 34C and 34D illustrate a coupling order of the wheel dial member 120, the wheel dial fixing member, and the housing in the electronic device 100 according to embodiments of the present disclosure.

Figure 35:
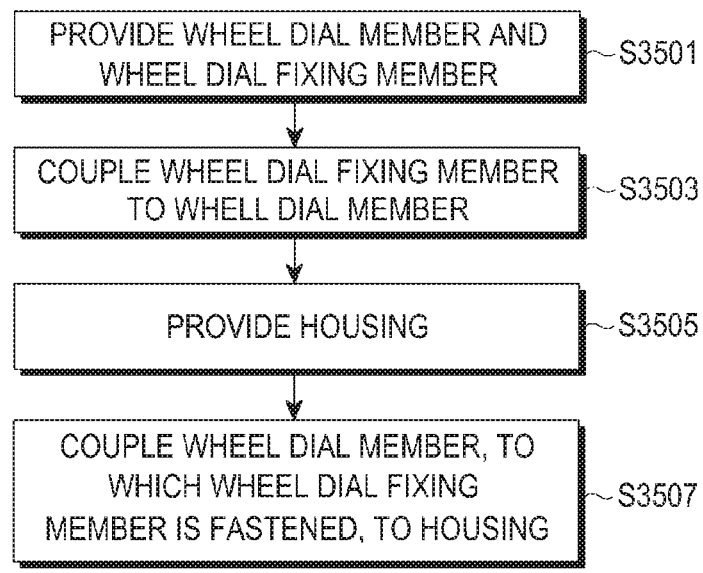
FIG. 35 illustrates a coupling order process of the wheel dial member, the wheel dial fixing member, and the housing in the electronic device according to embodiments of the present disclosure.

FIG. 35 illustrates a process of the coupling order of the wheel dial member 120, the wheel dial fixing member, and the housing 110 in the electronic device 100 according to embodiments of the present disclosure.

Referring to FIGS. 34A, 34B, 34C, 34D and 35, in step S3501, the wheel dial fixing member 130 and the wheel dial member 120 are provided. In step S3503, the wheel dial fixing member 130 is coupled to the wheel dial member 120 In step S3505, the housing 110 is provided separately from the wheel dial fixing member 120, to which the wheel dial fixing member 130 is fastened. In step S3507, the wheel dial member 120, to which the wheel dial fixing member 130 is fastened, is fastened onto the first ring-shaped structure 115 of the prepared housing 110. In this instance, a display may be exposed to one face of the housing 110 and the wheel dial member 120, which is rotatably provided, is mounted on the periphery of the housing 110.

For example, when the structure of FIGS. 1 to 23 is provided when the electronic device 100 is assembled through the above-described assembly process, when the wheel dial fixing member 130 is fastened to the wheel dial member 120, the second protrusion 133, which protrudes from the body 131 in the third direction, is introduced into and seated in the second recess 121 portion that protrudes in the fourth direction. In addition, the third protrusion 134, which protrudes in the second direction at a position adjacent to the second protrusion, is laid to face the inner face of the housing 110 that is formed with the second recess 121 portion.

When the wheel dial fixing member 130 is coupled to the housing 110 when the wheel dial fixing member 130 is seated on the wheel dial member 120, the first protrusion 132 and the body 131 portion, on which the first protrusion 132 is formed, are elastically pushed to the second recess 121 side to be temporarily introduced into the second recess 121. When the temporarily introduced first protrusion 132 and the body 131 portion, on which the first protrusion 132 is formed, correspond to the first recess, the first protrusion 132 is introduced into the first recess 111 while being moved to the first recess 111 side by a restoring force.

When assembled as described above, due to the coupling between the first protrusion 132 and the first recess 111 and the coupling between the second protrusion 133 and the second recess 121, the wheel dial member 120 is mounted on the first ring-shaped structure 115 of the housing 110 not to be separated in the first and second directions and to be rotatable while being prevented from moving in the first and second directions. Since the third protrusion 134 is seated in the second recess 133, the wheel dial member 120 is mounted while being prevented from moving in the third and fourth directions.

In addition when the structure of FIGS. 24 to 33 is provided when the electronic device 100a is assembled through the above-described assembly process, when the wheel dial fixing member 130a is fastened to the wheel dial member 120a, the second protrusion 133a, which protrudes from the body 131a in the fourth direction, is hooked to and seated in a second hook face 121a portion that forms a hook face in the fourth direction.

When the wheel dial fixing member 130a is coupled to the housing 110a when the wheel dial fixing member 130a is seated on the wheel dial member 120a, the insertion protrusion 103 is inserted into the inside of the recess portion 133aa that is formed adjacent to the second protrusion 133a. In addition, when the first hook portion 111a, which forms a hook ring, is introduced through the space between the second hook portion 121a and the first protrusion 132a, and is moved between the second hook portion 121a and the first protrusion 132a, the end of the first hook portion 111a is hooked to the first protrusion 132a and is seated on the first protrusion 132a.

When assembled as described above, due to the coupling between the first protrusion 132a and the first hook portion 111a and the coupling between the second protrusion 133a and the second hook portion 121a, the wheel dial member 120a is mounted on the first ring-shaped structure 115 of the housing 110a not to be separated in the first and second directions and to be rotatable while being prevented from moving in the first and second directions, and due to the coupling between the recess 133aa and the insertion protrusion 103, the wheel dial member 120a is mounted while being prevented from moving in the third and fourth directions.

Figure 36:
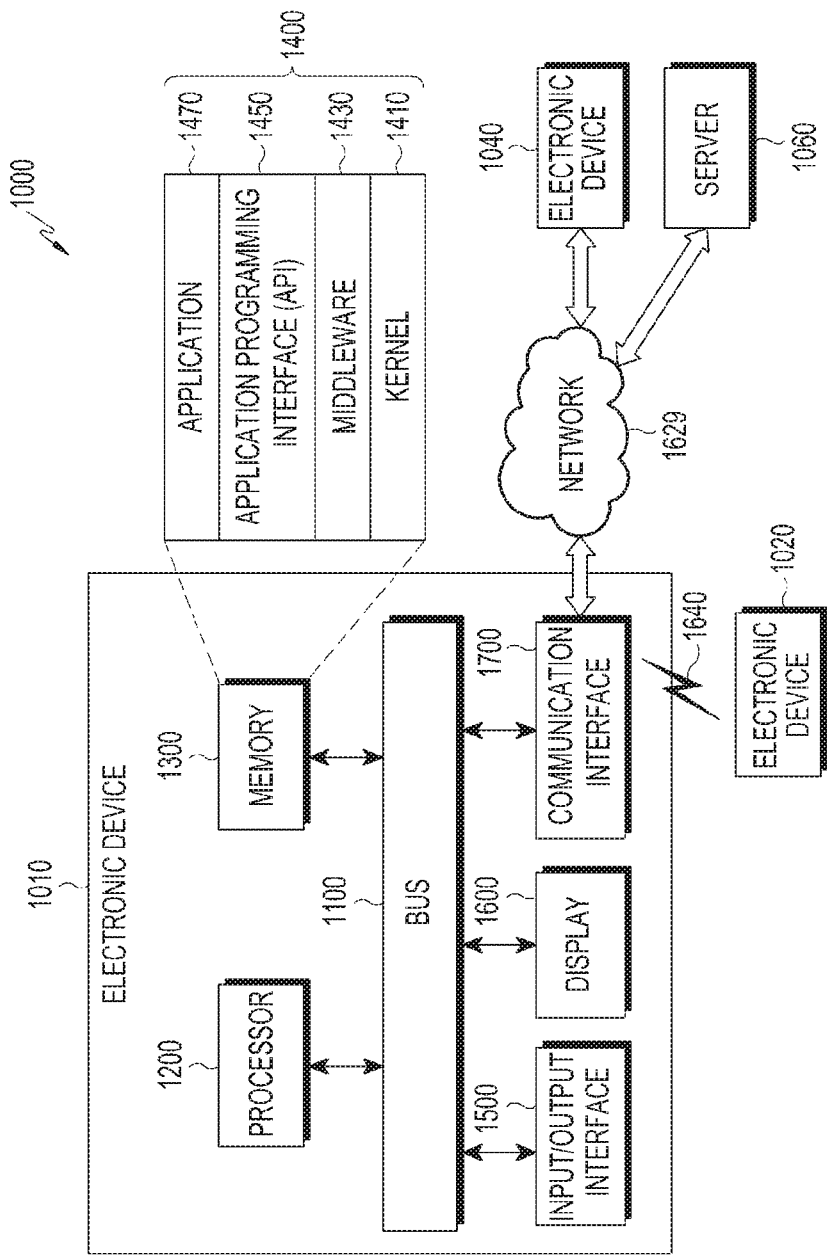
FIG. 36 illustrates an electronic device within a network environment in embodiments of the present disclosure.

FIG. 36 illustrates an electronic device within a network environment in embodiments of the present disclosure. The electronic device 1010 includes a bus 1100, a processor 1200, a memory 1300, an input/output interface 1500, a display 1600, and a communication interface 1700. However, the electronic device 1010 may omit at least one of the above-mentioned components or may additionally include other components.

The bus 1100 includes a circuit that connects the above-mentioned components 1200, 1300, 1500, 1600, and 1700 and transmits communication, such as a control message and/or data, between the components.

The processor 1200 includes one or more of a central processing unit (CPU), an application processor (AP), and a communication processor (CP). The processor 1200 executes an arithmetic operation or data processing that is related to a control and/or communication of one or more other components of the electronic device 1010. The processor 1200 may be a controller or includes the controller as a part thereof. Alternatively, the processor 1200 forms the controller.

The memory 1300 includes a volatile memory and/or a non-volatile memory. The memory 1300 stores commands or data that are related to one or more other components of the electronic device 1010. The memory 1300 stores software and/or a program 1400. The program 1400 includes a kernel 1410, a middleware 1430, an application programming interface (API) 1450, and/or application 1470. At least one of the kernel 1410, the middleware 1430, and the API 1450 may be in an operating system (OS).

The kernel 1410 controls or manages system resources, such as the bus 1100, the processor 1200, or the memory 1300) that are used for executing operations or functions implemented in the other programs, such as the middleware 1430, the API 1450, or the application 1470. In addition, the kernel 1410 provides an interface that allows the middleware 1430, the API 1450, or the application 1470 to access individual components of the electronic device 1010 so as to control or manage the system resources.

The middleware 1430 plays an intermediary role such that the API 1450 or the application 1470 communicate with the kernel 1410 so as to exchange data.

In addition, the middleware 1430 processes, according to priority, one or more task requests which are received from the application programs 1470. For example, the middleware 1430 assigns the priority to be capable of using a system resource of the electronic device 1010, such as the bus 1100, the processor 1200, or the memory 1300, to at least one of the application 1470. For example, the middleware 1430 performs scheduling or load balancing for the one or more task requests by processing the one or more requests according to the assigned priority.

The API 1450 allows the application 1470 to control functions provided from the kernel 1410 or the middleware 1430, and includes one or more interfaces or functions, such as for file control, window control, image processing, or character control.

The input/output interface 1500 serves as an interface to transmit commands or data, which are entered from a user or any other external device, to the other component(s) of the electronic device 1010, and outputs commands or data, which are received from the other component(s) of the electronic device 1010, to the user or the other external device.

The display 1600 includes a liquid crystal display (LCD), a light emitting diode (LED) display, an organic light emitting diode (OLED) display, a microelectromechanical system (MEMS) display, or an electronic paper display, and displays various contents, such as text, image, video, icon, or a symbol to the user. The display 1600 includes a touch screen that receives a touch input, a gesture input, a proximity input, or a hovering input that is made using an electronic pen or a part of the user's body.

The communication interface 1700 sets communication between the electronic device 1010 and an external device, such as a first external electronic device 1020, a second external device 1040, or a server 1060). For example, the communication interface 1700 communicates with the external device, such as the second external electronic device 1040 or the server 1060) by being connected with a network 1620 through wired or wireless communication. The communication interface 1700 includes a communication processor (CP) that is one of a plurality of modules that form the communication interface 1700. In one embodiment, the CP may be included in the processor 1200.

The wireless communication uses at least one of long-term evolution (LTE), LTE advanced (LTE-A), code division multiple access (CDMA), wideband CDMA (WCDMA), universal mobile telecommunication system (UMTS), wireless broadband (WiBro), or global system for mobile communication (GSM), as a communication protocol. In addition, the wireless communication includes short range communication 1640. The short range communication 1640 includes at least one of wireless fidelity (WiFi), near field communication (NFC), and global navigation satellite system (GNSS) which includes at least one of global positioning system (GPS), global navigation satellite system (Glonass), Beidou navigation satellite system (hereinafter, Beidou), Galileo, and the european global satellite-based navigation system, according to a use area or band width. Herein, "GPS" may be interchangeably used with "GNSS".

The wired communication uses at least one of universal serial bus (USB), high definition multimedia interface (HDMI), recommended standard 23200 (RS-23200), and plain old telephone service (POTS). The network 1620 includes a telecommunication network, which maybe at least one of a computer network, such as local area network (LAN) or wide area network (WAN), the Internet, and a telephone network.

Each of the first and second external electronic devices 1020 and 1040 may be a type of device that is the same as or different from the electronic device 1010. The server 1060 includes a group of one or more servers. All or some of the operations to be executed by the electronic device 1010 may be executed by another electronic device or a plurality of other electronic devices, such as the electronic devices 1020 and 1040 or the server 1060). When the electronic device 1010 should perform a certain function or service automatically or by a request, the electronic device 1010 may request some functions or services that are associated therewith from the other electronic devices, such as the electronic devices 1020 and 1040 or the server 1060, instead of or in addition to executing the functions or service by itself. The other electronic devices the requested functions or additional functions, and transmit the results to the electronic device 1010. The electronic device 1010 provides the requested functions or services by processing the received results as they are or additionally. For this purpose a cloud computing technique, a distributed computing technique, or a client-server computing technique may be used.

Figure 37:
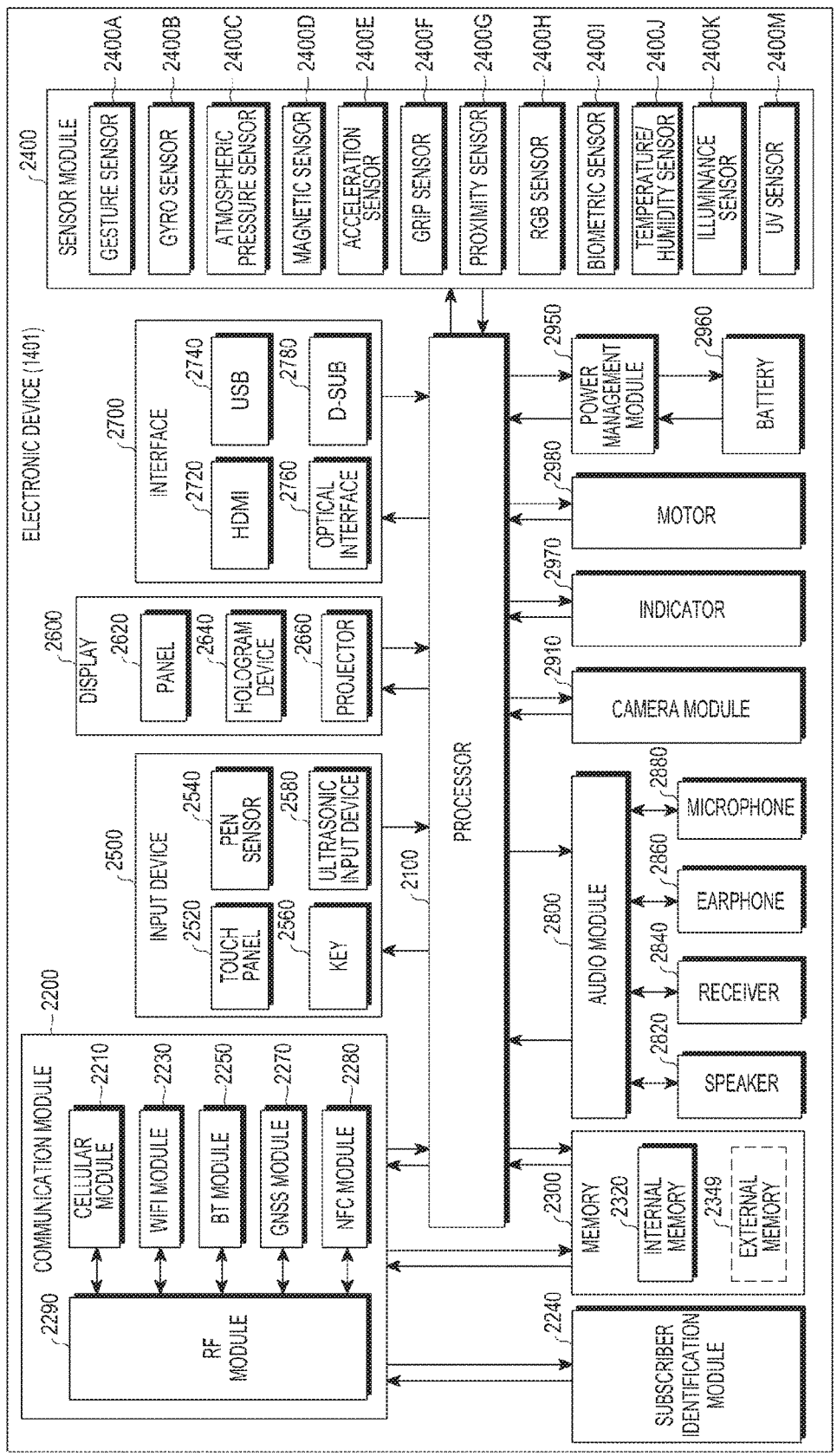
FIG. 37 is a block diagram of an electronic device according to embodiments of the present disclosure.

FIG. 37 is a block diagram of an electronic device 2010 according to embodiments of the present disclosure. The electronic device 2010 includes the whole or a portion of the electronic device 1010 illustrated in FIG. 36. The electronic device 2010 includes at least one AP 2100, a communication module 2200, a memory 2300, a sensor module 2400, an input device 2500, a display 2600, a subscriber identification module (SIM) card 2240, an interface 2700, an audio module 2800, a camera module 2910, a power management module 2950, a battery 2960, an indicator 2970, and a motor 2980.

The AP 2100 drives an operating system or an application program so as to control a plurality of hardware or software components connected thereto, performs various data processing and arithmetic operations, and may be implemented by a system-on-chip (SoC). The AP 2100 may further include a graphic processing unit (GPU) and/or an image signal processor. The AP 2100 includes at least some components, such as the cellular module 2210, among the components illustrated in FIG. 37. The AP 2100 loads a command or data received from at least one of the other components, such as a non-volatile memory, in a volatile memory to process the command and data, and stores various data in a non-volatile memory.

The communication module 2200 has a configuration that is the same as or similar to the communication interface 1700 of FIG. 36. The communication module 2200 includes a cellular module 2210, a WiFi module 2230, a Bluetooth™ module 2250, a GNSS module 2270, such as, an NFC module 2280, and a radio frequency (RF) module 2290.

The cellular module 2210 provides a voice call, a video call, a message service, or an internet service through a communication network. The cellular module 2210 performs discrimination and authentication of the electronic device 2010 within the communication network by using the subscriber identification module, such as the SIM card 2240. The cellular module 2210 performs at least some of the multimedia control functions that are provided by the AP 2100 The, and includes a communication processor (CP).

Each of the WiFi module 2230, the Bluetooth™ module 2250, the GNSS module 2270, and the NFC module 2280 includes a processor to process data transmitted/received through a corresponding module. According to a certain embodiment, at least two of the cellular module 2210, the WiFi module 2230, the Bluetooth™ module 2250, the GNSS module 2270, and the NFC module 2280 may be incorporated in a single integrated chip (IC) or an IC package.

The RF module 2290 transmits/receives a communication signal, such as an RF signal). The RF module 2290 includes a transceiver, a power amp module (PAM), a frequency filter, a low noise amplifier (LNA), or an antenna. According to another embodiment, at least one of the cellular module 2210, the WiFi module 2230, the Bluetooth™ module 2250, the GNSS module 2270, and the NFC module 2280 transmits/receives an RF signal through one or more separate RF modules.

The SIM card 2240 includes a card having a SIM and/or an embedded SIM, and may also include intrinsic identification information, such as integrated circuit card identifier (ICCID) or, such as an international mobile subscriber identity (IMSI).

The memory 2300 includes an internal memory 2320 and an external memory 2349. The internal memory 2320 includes at least one of a volatile memory, such as dynamic random access memory (DRAM), static RAM (SRAM), or synchronous DRAM (SDRAM), a non-volatile memory, such as one time programmable read-only memory (OT-PROM), programmable ROM (PROM), erasable and programmable ROM (EPROM), electrically erasable and programmable ROM (EEPROM), mask ROM, flash ROM, flash memory, such as NAND flash memory, or NOR flash memory), hard drive, or solid state drive (SSD).

The external memory 2349 may further include a flash drive, such as compact flash (CF), secure digital (SD), micro secure digital (Micro-SD), mini secure digital (Mini-SD), extreme digital (xD), multi-media card (MMC), or memory stick. The external memory 2340 may be functionally and/or physically connected to the electronic device 2010 through various interfaces.

For example, the sensor module 2400 measures a physical quantity or may sense an operating status of the electronic device 2010, and may then convert the measured or sensed information into electric signals. The sensor module 2400 includes at least one of a gesture sensor 2400A, a gyro sensor 2400B, an atmospheric pressure sensor 2400C, a magnetic sensor 2400D, an acceleration sensor 2400E, a grip sensor 2400F, a proximity sensor 2400G, a color sensor 2400H, such as RGB (Red, Green, Blue) sensor), a biometric sensor 2400I, a temperature/humidity sensor 2400J, an illuminance sensor 2400K, and a ultra-violet (UV) sensor 2400M. Additionally or alternatively, the sensor module 2400 includes an E-nose sensor, an electromyography (EMG) sensor (not illustrated), an electroencephalogram (EEG) sensor, an electrocardiogram (ECG) sensor, an infrared (IR) sensor, an iris sensor, and/or a fingerprint sensor. The sensor module 2400 may further include a control circuit for controlling one or more sensors incorporated therein.

The electronic device 2010 may further include a processor configured to control the sensor module 2400 as a part of the AP 2100 or separate from the AP 2100 so as to control the sensor module 2400 while the AP 210 is in the sleep state.

The input device 2500 includes a touch panel 2520, and at least one of a (digital) pen sensor 2540, a key 2560, and an ultrasonic input device 2580. At least one of a capacitive, resistive, infrared, and ultrasonic type touch panel may be used, and the touch panel 2520 may further include a control circuit, and a tactile layer that provides a tactile reaction to the user.

The (digital) pen sensor 2540 may be a portion of the touch panel or includes a separate recognition sheet. The key 2560 includes a physical button, an optical key, or a keypad. The ultrasonic input device 2580 may sense, through a microphone 2880, ultrasonic waves generated by an input tool so as to confirm data corresponding to the sensed ultrasonic waves.

The display 2600 includes a panel 2620, a hologram device 2640 and/or a projector 2660. The panel 2620 includes a configuration that is the same as or similar to that of the display 1600 of FIG. 36, and may be flexible, transparent, or wearable. The panel 2620 may be configured as a single module with the touch panel 2520. The hologram device 2640 projects a stereoscopic image in the air using interference of light. The projector 2660 projects light onto a screen so as to display an image. The screen may be located inside or outside the electronic device 2010. The display 2600 may further include a control circuit to control the panel 2620, the hologram device 2640, or the projector 2660.

The interface 2700 includes at least one of a high-definition multimedia interface (HDMI) 2720, a universal serial bus (USB) 2740, an optical interface 2760, and a d-subminiature (D-sub) 2780. For example, the interface 2700 may be included in the communication interface 1700 illustrated in FIG. 36. Additionally or alternatively, the interface 2700 includes a mobile high-definition link (MHL) interface, an SD card/multi-media card (MMC) interface, or an infrared data association (IrDA) standard interface.

The audio module 2800 may bi-directionally convert sound and electric signals. At least some of the components of the audio module 2800 may be included in the input/output interface 1500 illustrated in FIG. 36. The audio module 2800 processes sound information input or output through a speaker 2820, a receiver 2840, an earphone 2860, or the microphone 2880.

The camera module 2910 is a device that is capable of photographing a still image and a video image, and The camera module 2910 includes at least one image sensor, such as a front sensor or a rear sensor, a lens, an image signal processor (ISP), or a flash, such as a light-emitting diode (LED) or xenon lamp.

The power management module 2950 manages the electric power of the electronic device 2010. The power management module 2950 includes a power management integrated circuit (PMIC), a charger integrated circuit (IC), or a battery gauge. The PMIC may be configured in a wired and/or wireless charge type. The wireless charge type includes a magnetic resonance type, a magnetic induction type, or an electromagnetic wave type, and may further include an additional circuit for wireless charging, such as a coil loop, a resonance circuit, or a rectifier. The battery gauge measures the residual capacity of the battery 2960, and a voltage, a current, or a temperature during the charge. The battery 2960 includes a rechargeable battery and/or a solar battery.

The indicator 2970 indicates a specific status of the electronic device 2010 or of a part thereof, such as, such as a booting status, a message status, or a charged status. The motor 2980 converts an electric signal into a mechanical vibration, and may generate a vibration or a haptic effect. The electronic device 2010 includes a processor, such as a GPU, to support a mobile TV. The processor to support a mobile TV processes media data according to the standards of digital multimedia broadcasting (DMB), digital video broadcasting (DVB), or Mediaflo™.

Each of the above-described component elements of hardware according to the present disclosure may be configured with one or more components, and the names of the corresponding component elements may vary based on the type of electronic device. The electronic device according to embodiments of the present disclosure includes at least one of the aforementioned elements. Some elements may be omitted or other additional elements may be further included in the electronic device. Some of the hardware components according to embodiments may be combined into one entity, which performs functions identical to those of the relevant components before the combination.

Figure 38:
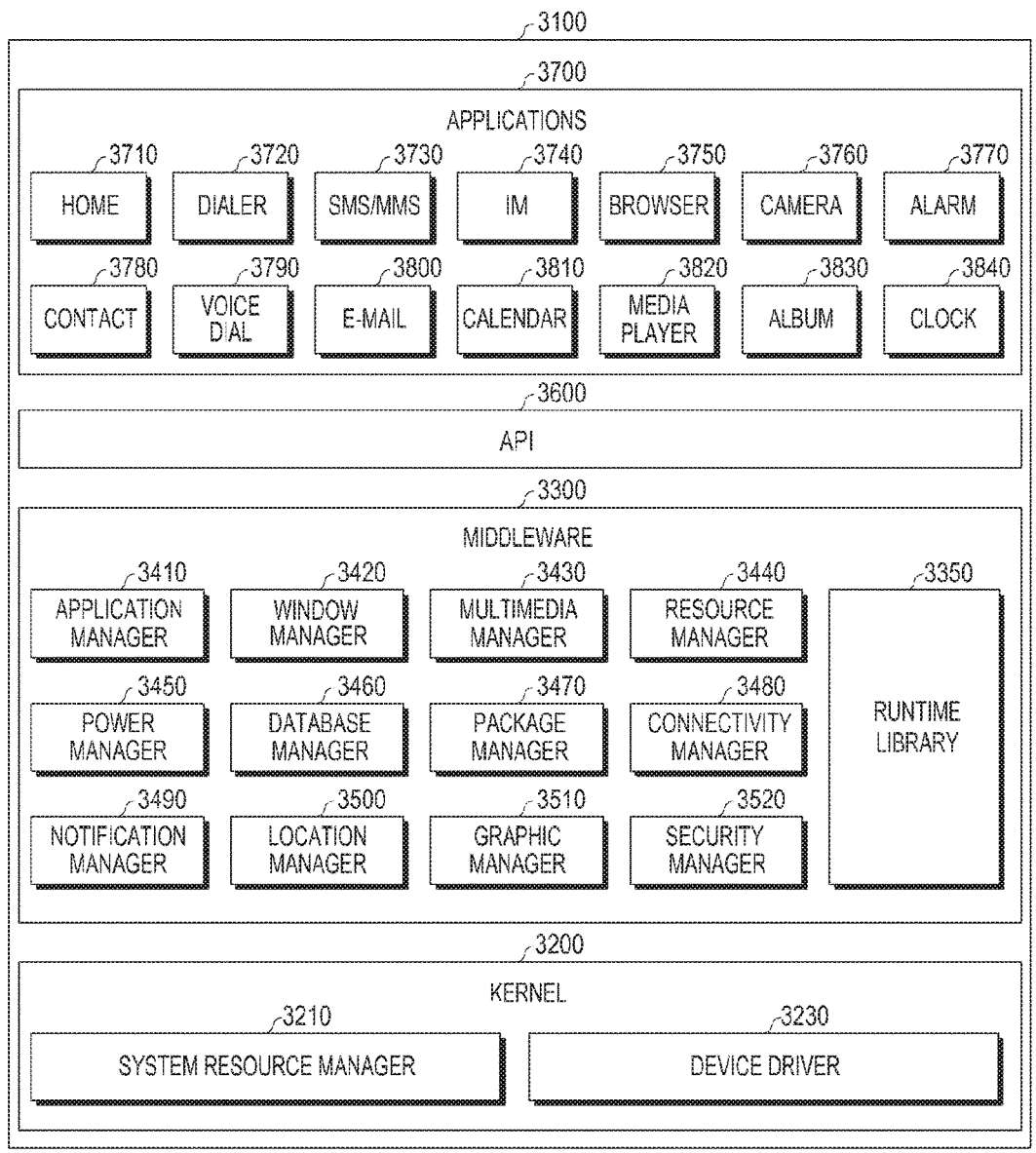
FIG. 38 is a block diagram illustrating a program module according to embodiments of the present disclosure.

FIG. 38 is a block diagram illustrating a program module according to embodiments. According to one embodiment, a program module 3100 includes an OS that controls resources associated with an electronic device and/or various applications 3700 that are driven on the operating system. The operating system may be Android, iOS, Windows, Symbian, Tizen, or Bada.

The program module 3100 includes a kernel 3200, a middleware 3330, an API 3600, and/or applications 3700. At least a part of the program module 3100 may be preloaded on the electronic device, or may be downloaded from an external electronic device, such as 1020 or 1040, or the server 1060.

The kernel 3200 includes a system resource manager 3210 and/or a device driver 3230. The system resource manager 3210 performs a control, allocation, or recovery of a system resource. The system resource manager 3210 includes a process management unit, a memory management unit, or a file system management unit. The device driver 3230 includes a display driver, a camera driver, a Bluetooth™ driver, a common memory driver, a USB driver, a keypad driver, a WiFi driver, an audio driver, or an inter-process communication (IPC) driver.

The middleware 3330 provides a function that is commonly required by the applications 3700, or provides various functions to the applications 3700 through the API 3600 such that the applications 3700 can efficiently use the limited system resources within the electronic device. The middleware 3330 includes at least one of a runtime library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, and a security manager 3520.

The runtime library 3350 includes a library module that is used by a compiler in order to add a new function through a program language while the applications 3700 are executed. The runtime library 3350 performs input/output management, memory management, or a function for an arithmetic function.

The application manager 3410 manages a life cycle of at least one application among the applications 3700. The window manager 3420 manages a GUI resource that is used in a screen. The multimedia manager 3430 may grasp a format required for reproducing various media files, and performs encoding or decoding of the media files by using a codec that is suitable for the corresponding format. The resource manager 3440 manages a resource, such as a source code, a memory, or a storage space, of at least one application among the applications 3700.

The power manager 3450 is operated together with a basic input/output system (BIOS) so as to manage a battery or a power source, and provides power information that is required for operating the electronic device. The database manager 3460 generates, retrieves, or changes a database to be used by at least one application among the applications 3700. The package manager 3470 manages the installation or update of an application that is distributed in the form of a package file.

The connectivity manager 3480 manages a wireless connection of WiFi, Bluetooth, or the like. The notification manager 3490 displays or notify events, such as an arrival message, appointment, and proximity notification in a manner that does not disturb the user. The location manager 3500 manages position information of the electronic device. The graphic manager 3510 manages a graphic effect to be provided to the user or a user interface associated therewith. The security manager 3520 provides all security functions required for system security, or user authentication. According to one embodiment, when the electronic device includes a phone function, the middleware 3330 includes a telephony manager to manage a voice or video call function of the electronic device.

The middleware 3330 includes a middleware module that forms a combination of various functions of the above-described components, provides a module that is specialized for each type of operation system in order to provide differentiated functions, and dynamically deletes some of the existing components or adds new components.

The API 3600 is a collection of API programming functions, and is provided in different configurations according to operation systems. For example, Android or iOS provides one API set for each platform and Tizen provides two or more API sets for each platform.

The applications 3700 include one or more applications that can execute the functions of home 3710, dialer 3720, SMS/MMS 3730, instant message (IM) 3740, browser 3750, camera 3760, alarm 3770, contact 3780, voice dial 3790, e-mail 3800, calendar 3810, media player 3820, album 3830, and watch 3840, health care, such as measurement of a quantity of motion, or blood sugar, or provision of environmental information, such as provision of atmospheric pressure, humidity, or temperature information.

The applications 3700 include an application that supports information exchange between the electronic device 1010 and the external electronic devices 1020 and 1040 (hereinafter, an "information exchange application"). The information exchange application includes a notification relay application to transmit specific information to the external electronic devices, or a device management application to manage the external electronic devices.

For example, the notification relay application includes a function of relaying notification information generated from any other application of the electronic device to the external electronic devices 1020 and 1040. In addition, the notification relay application receives notification information from an external electronic device, and provides the notification information to the user.

The device management application installs, deletes, or updates at least one function of an external electronic device, such as 1020 or 1040 that communicates with the electronic device, such as turn-on/turn-off of the external electronic device itself or some components thereof or adjustment of brightness or resolution of a display, an application operated in the external electronic device, or a service provided by the external electronic device, such as a telephony or message service.

The applications 3700 include an application designated according to an attribute of an external electronic device 1020 or 1040, such as a healthcare application of a mobile medical device. The applications 3700 include an application received from, for example, the server 1060 or the electronic device 1020 or 1040, and include a preloaded application or a third party application that is capable of being downloaded from the server. Names of the elements of the program module 3100, according to the above-described embodiments of the present disclosure, may change depending on the type of OS.

According to embodiments of the present disclosure, at least some of the program module 3100 may be implemented in software, firmware, hardware, or a combination of two or more thereof. At least some of the program module 3100 may be executed by the processor. At least some of the program module 3100 include a module, a program, a routine, a set of instructions, and/or a process for performing one or more functions.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device comprising:
a housing that includes a first face that faces in a first direction, and a second face that faces in a second direction that is opposite to the first direction;
a circular opening that is formed in the first face of the housing;
a circular display that is at least partially exposed through the circular opening;
a first ring-shaped structure that is disposed around the circular opening;
a second ring-shaped structure that is disposed around the circular opening, and is physically rotatable; and
a coupling structure that is disposed between at least a portion of the first ring-shaped structure and at least a portion of the second ring-shaped structure,
wherein the first ring-shaped structure includes:
a first portion that is flat and is positioned adjacent to the display, which is at least partially exposed, along a periphery of the display;
a second portion that protrudes in the first direction from a region of the first portion, which is adjacent to the display; and
a first recess that is formed along a periphery of the second portion,
wherein the second ring-shaped structure includes a second recess that is formed along the periphery of the second ring-shaped structure, and
wherein the coupling structure includes:
a body that forms a closed loop that extends along the at least one of first ring-shaped structure and the second ring-shaped structure;
a first protrusion that fills at least a portion of the first recess; and
a second protrusion that fills at least a portion of the second recess.

2. The electronic device of claim 1, wherein the first recess is formed in a third direction that is directed to a center of the first ring-shaped structure,
wherein the second recess is formed in a fourth direction that is opposite to the third direction,
wherein the first protrusion protrudes in the third direction from the body and is seated in the first recess, and
wherein the second protrusion protrudes in the third direction from the body and is seated in the second recess.

3. The electronic device of claim 2, wherein the coupling structure includes a third protrusion that protrudes in the second direction from the body.

4. The electronic device of claim 3, wherein the first protrusion, the second protrusion, and the third protrusion protrude from different portions of the body, respectively.

5. The electronic device of claim 4, wherein the first protrusion and the second protrusion protrude alternately and in alternate directions from the body.

6. The electronic device of claim 4, wherein the third protrusion is provided at a position that corresponds to a mounting position of the second protrusion, and
wherein the second protrusion and the third protrusion form a " ┐ " shape in a cross section or a " ⊏ " shape in the cross section.

7. The electronic device of claim 6, wherein one or more embossed portions are provided on either the second protrusion or the third protrusion.

8. The electronic device of claim 1, wherein the second ring-shaped structure is formed of a material that has surface lubricity.

9. The electronic device of claim 8, wherein the second ring-shaped structure includes at least one of polyoxymethylene, polyacetal, and polyamide.

10. The electronic device of claim 1, wherein the housing is provided with an insertion member that is supported by an elastic member, and
wherein a plurality of holes are formed on a bottom face of the second ring-shaped structure such that the insertion member is seated in the plurality of holes while being moved.

11. An electronic device comprising:
a housing that includes a first face that faces in a first direction, and a second face that faces in a second direction that is opposite to the first direction;
a circular opening that is formed in the first face of the housing;
a circular display that is at least partially exposed through the opening;
a first ring-shaped structure that is disposed around the opening;
a second ring-shaped structure that is disposed around the opening, and is physically rotatable; and
a coupling structure that is disposed between at least a portion of the first ring-shaped structure and at least a portion of the second ring-shaped structure,
wherein the first ring-shaped structure includes:
a first portion that is flat and is positioned adjacent to the display, which is at least partially exposed, along a periphery of the display; and
first hook portions that are spaced apart from each other along the periphery of the first portion and protrude in the first direction,
wherein the second ring-shaped structure includes a second hook portion that is formed along a periphery of the second ring-shaped structure, and
wherein the coupling structure includes:
a body that forms a closed loop that extends along at least one of the first ring-shaped structure and the second ring-shaped structure;
a first protrusion that is at least partially hooked to the first hook portion; and
a second protrusion that is at least partially hooked to the second hook portion.

12. The electronic device of claim 11, wherein the first hook portion forms a hook ring in a third direction that is directed to a center of the first ring-shaped structure,
wherein the second hook portion forms a hook face in the third direction,
wherein the first protrusion protrudes in a fourth direction that is opposite to the third direction, and
wherein the second protrusion protrudes in the fourth direction from the body.

13. The electronic device of claim 12, wherein the coupling structure includes a recess portion that is formed to be recessed in the first direction from the body, and
wherein the housing includes an insertion protrusion that is at least partially introduced into the recess portion.

14. The electronic device of claim 13, wherein the first protrusion and the second protrusion protrude alternately and in alternate directions from a same portion of the body.

15. The electronic device of claim 14, wherein the first protrusion is formed to have a protrusion length that is shorter than the second protrusion, and the electronic device is provided with a rotary device.

16. The electronic device of claim 15, wherein the first hook portion passes between the second hook portion and the first protrusion to be at least partially hooked to the second protrusion.

17. The electronic device of claim 13, wherein the recess portion is provided at a position that corresponds to a mounting position of the second protrusion.

18. The electronic device of claim 17, wherein at least one of the embossed portions is provided on the second protrusion.

19. The electronic device of claim 11, wherein the second ring-shaped structure is formed of a material that has surface lubricity.

20. The electronic device of claim 19, wherein the second ring-shaped structure includes at least one of polyoxymethylene, polyacetal, and polyamide.

* * * * *